(12) United States Patent
Damman et al.

(10) Patent No.: US 9,135,347 B2
(45) Date of Patent: Sep. 15, 2015

(54) EXERCISE TRACKING AND ANALYSIS SYSTEMS AND RELATED METHODS OF USE

(71) Applicant: Assess2Perform, LLC, Boulder, CO (US)

(72) Inventors: Scott Robert Damman, Guffey, CO (US); George David O'Neill, Boulder, CO (US); Ivan H. Kim, Dublin, CA (US)

(73) Assignee: Assess2Perform, LLC, Boulder, CO (US)

(*) Notice: Subject to any disclaimer, the term of this patent is extended or adjusted under 35 U.S.C. 154(b) by 0 days.

(21) Appl. No.: 14/261,848

(22) Filed: Apr. 25, 2014

(65) Prior Publication Data

US 2015/0170530 A1    Jun. 18, 2015

Related U.S. Application Data

(60) Provisional application No. 61/917,805, filed on Dec. 18, 2013.

(51) Int. Cl.
*G06F 17/30* (2006.01)
*G09B 5/00* (2006.01)
*A63B 37/00* (2006.01)

(52) U.S. Cl.
CPC .......... *G06F 17/30864* (2013.01); *G09B 5/00* (2013.01); *A63B 37/00* (2013.01)

(58) Field of Classification Search
CPC .......... A63B 37/00; A63B 2024/0012; A63B 2225/50
See application file for complete search history.

(56) References Cited

U.S. PATENT DOCUMENTS

| | | |
|---|---|---|
| 6,005,548 A | 12/1999 | Latypov et al. |
| 6,251,048 B1 | 6/2001 | Kaufman |
| 6,266,623 B1 | 7/2001 | Vock et al. |
| 6,499,000 B2 | 12/2002 | Flentov et al. |
| 6,539,336 B1 | 3/2003 | Vock et al. |
| 6,702,719 B1 | 3/2004 | Brown et al. |
| 6,856,934 B2 | 2/2005 | Vock et al. |
| 6,885,971 B2 | 4/2005 | Vock et al. |
| 6,963,818 B2 | 11/2005 | Flentov et al. |
| 7,455,621 B1 * | 11/2008 | Anthony ............ 482/8 |
| 7,666,118 B1 * | 2/2010 | Anthony ............ 482/8 |
| 7,911,339 B2 | 3/2011 | Vock et al. |
| 8,217,788 B2 | 7/2012 | Vock et al. |
| 8,217,797 B2 | 7/2012 | Ikoyan |

(Continued)

OTHER PUBLICATIONS

"Train with Push" website, Push Inc., Nov. 12, 2014, retrieved from Internet on Mar. 22, 2015 via Internet Archieve from URL <http://www.trainwithpush.com/>.*

(Continued)

*Primary Examiner* — Jay Liddle
*Assistant Examiner* — Ryan Hsu
(74) *Attorney, Agent, or Firm* — Bookoff McAndrews, PLLC

(57) ABSTRACT

A method for assessing physical performance may include receiving first performance data relating to an activity performed by a user, and generating a first performance profile. The method also may include generating a first comparison by comparing the first performance data to a second performance profile relating to the activity, and generating feedback based on the first comparison by indicating whether the first performance profile deviated from the second performance profile.

11 Claims, 17 Drawing Sheets

(56) References Cited

U.S. PATENT DOCUMENTS

| | | | |
|---|---|---|---|
| 8,749,380 | B2 | 6/2014 | Vock et al. |
| 2002/0128127 | A1* | 9/2002 | Chen ............................ 482/106 |
| 2003/0040348 | A1* | 2/2003 | Martens ........................... 463/1 |
| 2003/0163287 | A1 | 8/2003 | Vock et al. |
| 2003/0211916 | A1* | 11/2003 | Capuano ........................... 482/8 |
| 2004/0014567 | A1* | 1/2004 | Mendel ............................. 482/8 |
| 2005/0233871 | A1* | 10/2005 | Anders et al. ................... 482/93 |
| 2007/0026975 | A1* | 2/2007 | Marty et al. ................... 473/467 |
| 2007/0219059 | A1* | 9/2007 | Schwartz et al. ................. 482/8 |
| 2009/0118100 | A1 | 5/2009 | Oliver et al. |
| 2010/0041498 | A1* | 2/2010 | Adams ........................ 473/451 |
| 2011/0072457 | A1* | 3/2011 | Lanfermann et al. ........... 725/34 |
| 2012/0035021 | A1* | 2/2012 | Saalasti et al. .................... 482/9 |
| 2012/0165165 | A1* | 6/2012 | Iankov ........................... 482/106 |
| 2012/0190505 | A1 | 7/2012 | Shavit et al. |
| 2012/0277891 | A1* | 11/2012 | Aragones et al. ............... 700/91 |
| 2012/0323496 | A1 | 12/2012 | Burroughs et al. |
| 2013/0123068 | A1* | 5/2013 | Sultan et al. ....................... 482/2 |
| 2013/0178960 | A1* | 7/2013 | Sheehan et al. ................. 700/91 |
| 2013/0203475 | A1* | 8/2013 | Kil et al. ............................ 463/7 |
| 2013/0303286 | A1* | 11/2013 | Ferguson et al. ............... 463/37 |
| 2014/0135593 | A1* | 5/2014 | Jayalth et al. ................. 600/301 |

OTHER PUBLICATIONS

"Push: The first fitness tracking device that measures strength", Push Inc, Oct. 4, 2013, YouTube, retrieved from Internet on Mar. 22, 2015 from URL <https://www.youtube.com/watch?v=euGH__ak54Dc >.*

RizKnows, PUSH Band (Unboxing & Initial Review), Feb. 5, 2015, YouTube, retrieved from Internet on Mar. 22, 2015 at URL<https://www.youtube.com/watch?v=xAAM3YKQuuY>.*

RizKnows, "PUSH Band (Workout Test#2)—PUSH Assist", Feb. 11, 2015, YouTube, retrieved from Internet on Mar. 23, 2015 at URL <https://www.youtube.com/watch?v=3ULFM-3uxLk>.*

"Meet Moov: your personal coach," Feb. 28, 2014, Internet Archive, 4 pages <https://web.archive.org/web/20140228154659/http://preordermoov.cc/>.

"Amiigo | Explore," Mar. 30, 2014, Internet Archive, 5 pages <https://web.archive.org/web/20140330041103/https://amiigo.com/>.

"Hockey training system; motion tracking and analysis of your power and speed hockey performances—Quattriuum—Movement Intelligence Experts," Apr. 2, 2014, Internet Archive, 3 pages <https://web.archive.org/web/20140330041103/https://amiigo.com/>.

Gerwin A. L. Meijer et al., Methods to Assess Physical Activity with Special Reference to Motion Sensors and Accelerometers, IEEE Transactions on Biomedical Engineering, vol. 38, No. 3, Mar. 1991, pp. 221-229.

Christian J. Thompson et al., Abstract of Reliability and Comparability of the Accelerometer as a Measure of Muscular Power, Medicine & Science in Sports & Exercise, vol. 31, Issue 6, pp. 897-902, 1999.

User Manual and Quick Start Guide for the Myotest Device and the Myostest PRO Software, 76 pages, Mar. 2008.

Search Report and Written Opinion of the International Searching Authority mailed Mar. 6, 2015 in corresponding International PCT Application No. PCT/US2014/068818 (9 pages).

* cited by examiner

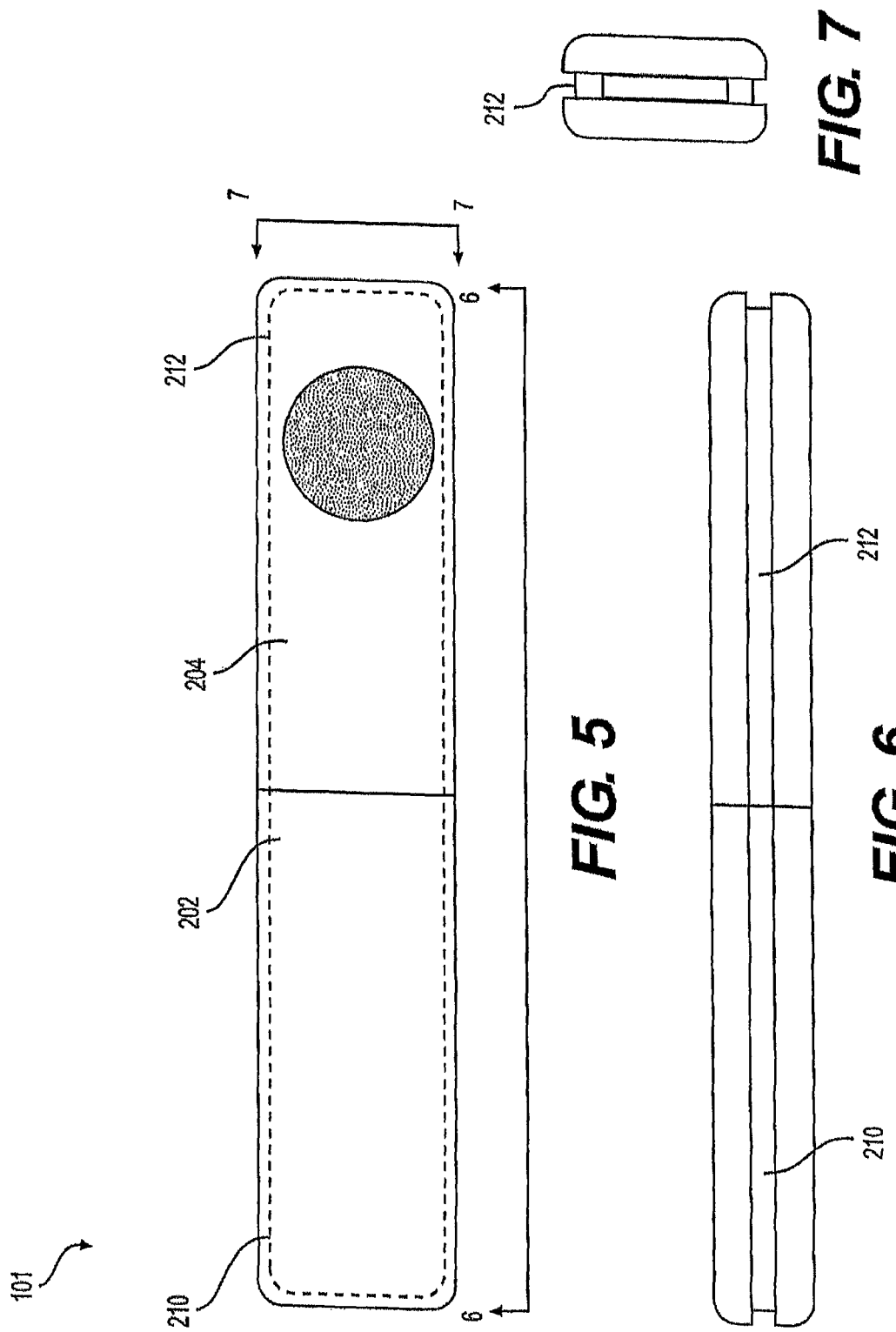

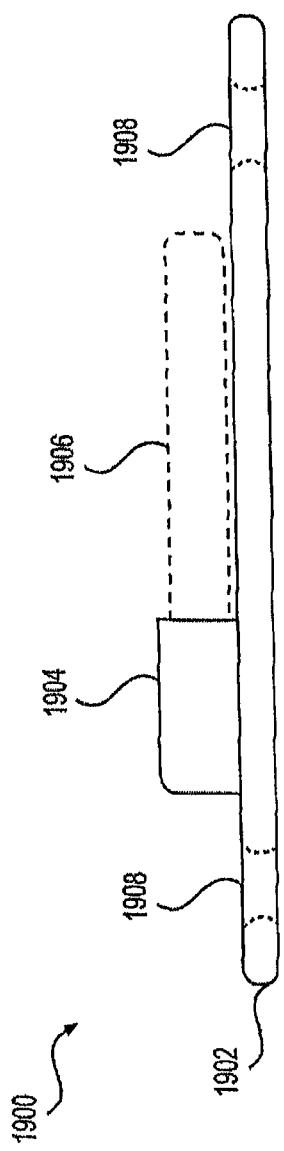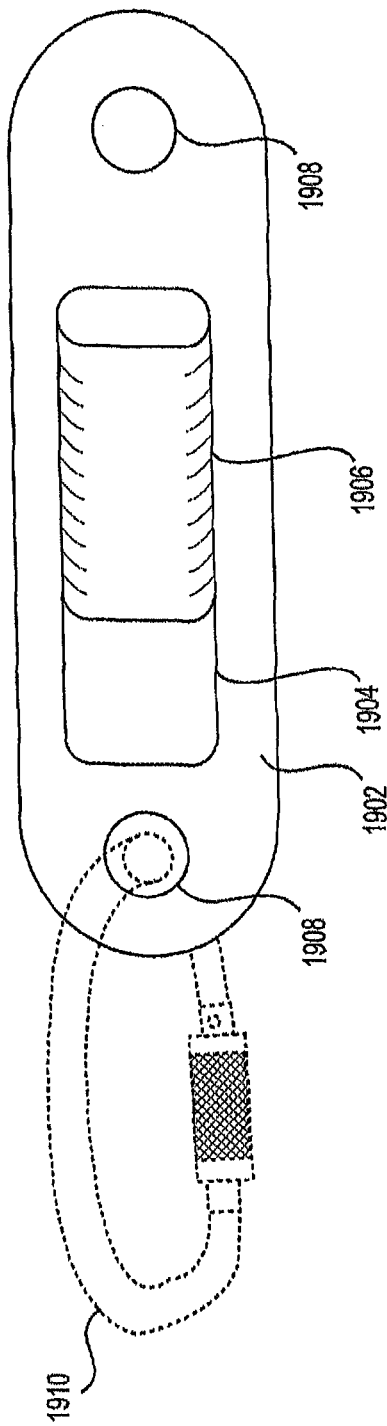
FIG. 19
FIG. 20

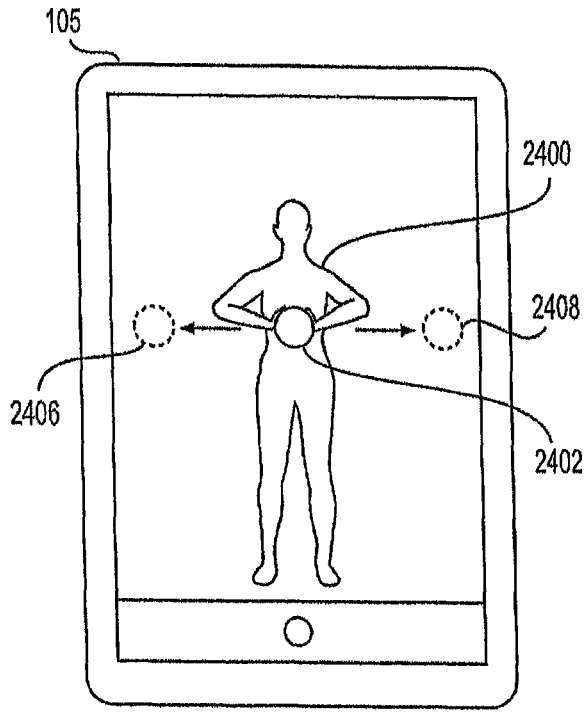
FIG. 24
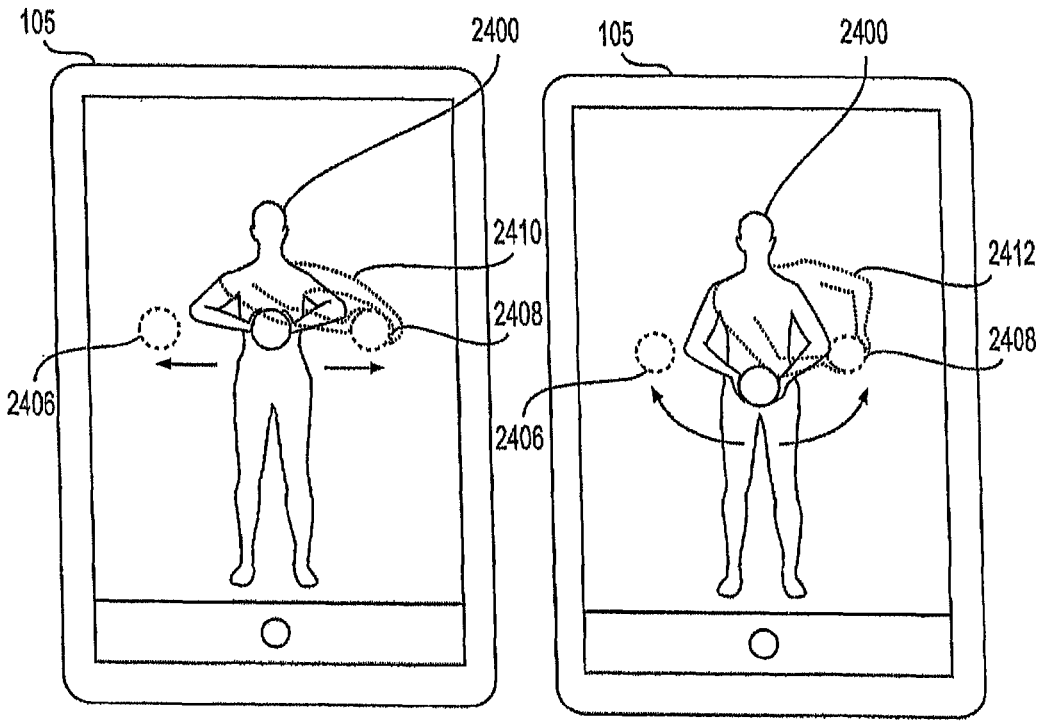
FIG. 25
FIG. 26

EXERCISE TRACKING AND ANALYSIS SYSTEMS AND RELATED METHODS OF USE

CROSS-REFERENCE TO RELATED APPLICATIONS

This application claims the benefit or priority under 35 U.S.C. §119 to U.S. Provisional Application No. 61/917,805, filed Dec. 18, 2013, entitled "System for Fitness Assessment, Training, Rehabilitation, Logging, Displaying and Transmitting Physical Movement Patterns and Characteristics," the entirety of which is incorporated by reference herein.

TECHNICAL FIELD

The present disclosure relates to exercise tracking and analysis systems and related methods of use, including, but not limited to, training, therapeutic, or rehabilitation programs or regimens based on the disclosed devices and methods.

BACKGROUND

Exercise and activity trackers are becoming increasingly popular. Even still, when performing various exercises, it can often be difficult to quantify and compare progress over time. Further, advanced testing often requires the use of expensive, specialized equipment that is unfamiliar to the test subject. The problem can be compounded when exercises are performed that utilize traditionally non-quantifiable objects, such as, e.g., elastic bands. People are further not necessarily aware of an amount of force that they are exerting against elastic bands, and therefore prescribing exercises for people using elastic bands is necessarily guesswork. Even professionals cannot accurately determine when exhaustion or fatigue are occurring as accurately as direct measurement of movement.

Thus, a need exists for an exercise tracking system that can quantify exercise parameters for a variety of conventionally available exercise methods.

There is an additional need to assist athletes and persons undergoing physical therapy (e.g., patients) in maintaining proper form during physical activities (e.g., exercise) to prevent injuries. For example, supervision of athletes and patients by a coach, personal trainer, or physical therapist, is not always practical, and can be expensive. Therefore, a need exists for a low-cost monitoring system that can automatically prescribe recommendations to athletes or patients, or allow for remote supervision and analysis by a coach, personal trainer, or physical therapist.

Still further, a need exists in the athletic performance monitoring, coaching, and recruiting fields, to quantify athletic performance. Traditionally, such monitoring has been done by direct observation, recorded observation, or testing using specialized equipment or visual and hand-recording of data. Such mechanisms are prone to human bias and error. Thus, a need exists for an exercise tracking system that can quantify athletic performance for use in coaching and recruiting.

SUMMARY OF THE DISCLOSURE

The present disclosure relates to exercise tracking and analysis systems and related methods of use.

In one aspect, the present disclosure is directed to a method for assessing physical performance. The method may include receiving first performance data relating to an activity performed by a user, and generating a first performance profile. The method may also include generating a first comparison by comparing the first performance data to a second performance profile relating to the activity, generating feedback based on the first comparison by indicating whether the first performance profile deviated from the second performance profile.

Various aspects of the present disclosure may include one or more of the following examples: wherein the first and second performance profiles may both relate to a form of the activity; wherein the first performance profile may include an actual alignment of the user at one or more time periods during performance of the activity; wherein the method may further include displaying the first performance profile by displaying an actual alignment of the user at the one or more time periods during performance of the activity; wherein the method may further include displaying the second performance profile by displaying an ideal alignment of the user at the one or more time periods during performance of the activity; wherein the method may further include simultaneously displaying the actual alignment of the user and the ideal alignment of the user at the one or more time periods; wherein the method may further include simultaneously displaying the actual alignment of the user and the ideal alignment of the user and with reference to a common axis such that any correspondence or deviation of the actual alignment and the ideal alignments can be visualized; wherein the first and second performance profiles may further include the position of an object at one or more time periods during performance of the activity; wherein the method may further include providing a real-time indication that the first performance profile has deviated from the second performance profile during performance of the activity; and wherein the performance data may be collected by a device coupled to at least one of the user or an implement used to perform the activity.

In another aspect, the present disclosure is directed to a method for assessing physical performance. The method may include receiving first performance data relating to an exercise performed at a first parameter, and generating a first performance profile based on the first performance data. The method also may include receiving second performance data relating to the exercise performed at a second parameter, and generating a second performance profile based on the second performance data. The method also may include comparing the first performance profile with the second performance profile, and generating feedback based on the comparison.

Various aspects of the present disclosure may include one or more of the following examples: wherein the first performance data may relate to an exercise performed with a first object having a first parameter, and the second performance data may relate to an exercise performed with a second object having a second parameter; wherein the first and second parameter may be weights; wherein the first and second parameter may be moduli of elasticity; wherein the first and second objects may be balls, medicine balls, weights, dumbbells, kettlebells, or exercise machines; wherein the exercise may be a wall ball exercise, a front squat, an overhead squat, a shoulder press, a push press, a push jerk, a deadlift, a sumo deadlift high pull, a clean, or a throw; wherein the first performance data may relate to an exercise performed at a first force level, and the second performance data may relate to an exercise performed at a second force level; wherein the first performance data may relate to an exercise performed with a band having a first resistance, and the second performance data may relate to an exercise performed with a band having a second resistance; wherein the first and second performance profiles may be based on one or more of an actual alignment of the user at one or more time periods during the exercise, an ideal alignment of the user at one or more time periods during the exercise, peak watts, average watts, speed of exercise performed, force of exercise performed, rotational explosiveness, and force over time; wherein generating feedback based on the comparison may further include making a recommendation to a user to perform the exercise at the first parameter or at the second parameter; and wherein the first and second performance profiles may be based on a deviation from an ideal performance profile.

In yet another aspect, the present disclosure is directed to a method for assessing physical performance. The method may include receiving first performance data relating to an exercise performed by a user with a first ball having a first weight, the first ball being operatively coupled to a sensor, and generating a first performance profile based on the first performance data. The method also may include receiving second performance data relating to the exercise performed with a second ball having a second weight, the second ball being operatively coupled to a sensor and the first and second weights being different, and generating a second performance profile based on the second performance data. The method also may include comparing the first performance profile with the second performance profile, and generating feedback based on the comparison by making a recommendation to the user to perform the exercise with the first ball or the second ball based on the comparison.

Various aspects of the present disclosure may include one or more of the following examples: wherein the first ball may be coupled to a first sensor and the second ball is coupled to a second sensor that is separate from the first sensor; and wherein the first and second performance profiles may be based on one or more of an alignment of the user at one or more time periods during the exercise, an alignment of the first or second ball at one or more time periods during the exercise, an actual alignment of the first or second ball at one or more time periods during the exercise, an ideal alignment of the user at one or more time periods during the exercise, an ideal alignment of the first or second ball at one or more time periods during the exercise, peak watts, average watts, speed of exercise performed, force exercise performed, rotational explosiveness, force over time, and a deviation from an ideal performance profile.

BRIEF DESCRIPTION OF THE FIGURES

The accompanying drawings, which are incorporated in and constitute a part of this specification, illustrate various exemplary embodiments and together with the description, serve to explain the principles of the disclosed embodiments.

FIGS. 2-5 are various illustrations of an exercise module according to an embodiment of the present disclosure.

FIG. 6 is a side view of the exercise module of FIG. 5 taken along line 6-6.

FIG. 7 is a side view of the exercise module of FIG. 5 taken along line 7-7.

FIGS. 19 and 20 illustrate an exercise module according to an embodiment of the present disclosure.

FIGS. 24-27 illustrate exemplary screenshots of user interfaces in according to embodiments of the present disclosure.

DETAILED DESCRIPTION

Figure 1:
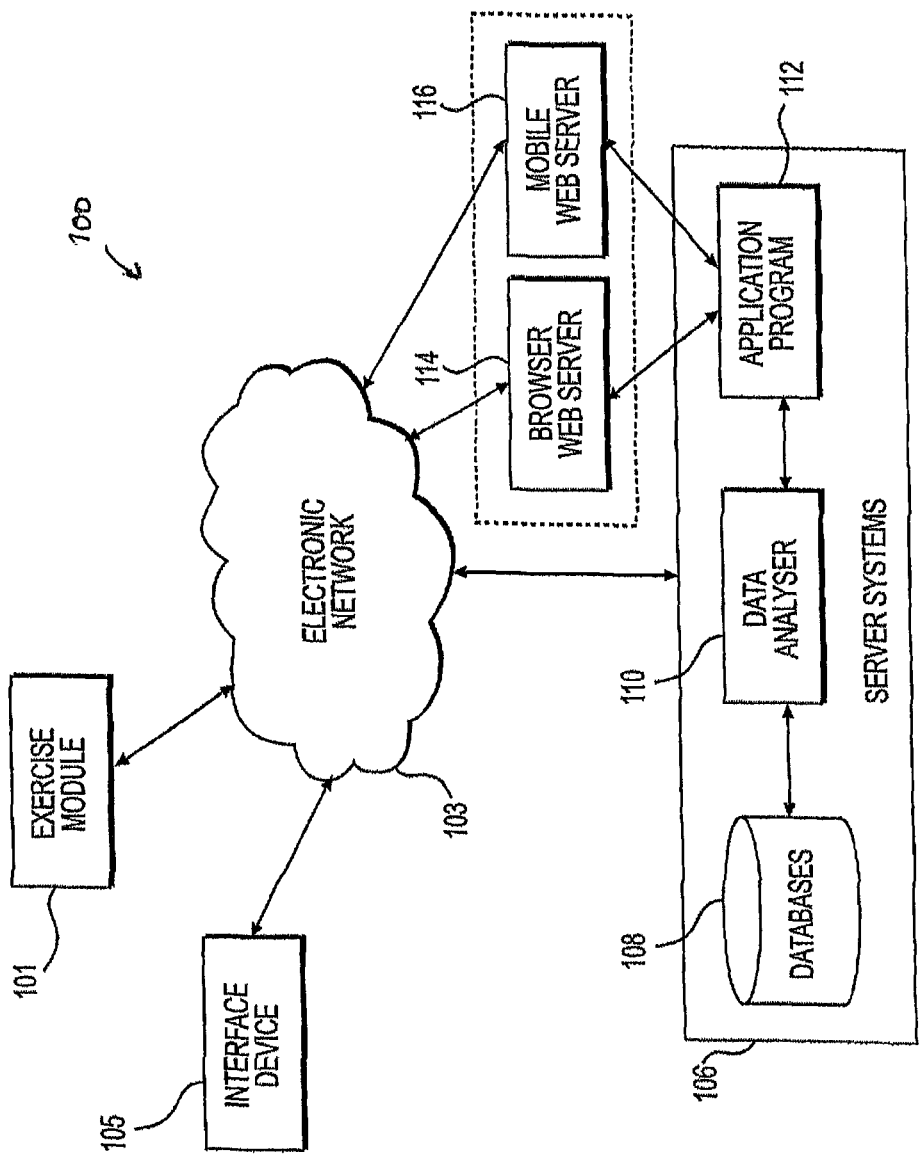
FIG. 1 is a schematic view illustration of an exercise system according to an embodiment of the present disclosure.

Referring now to the enclosed figures, FIG. 1 is a schematic diagram of a system 100 and environment for collecting, processing, and displaying physical exertion (e.g., exercise) and/or activity data, according to an exemplary embodiment of the present disclosure. As shown in FIG. 1, the system and environment may include a plurality of exercise modules 101 and interface devices 105 disposed in communication with an electronic network 103. It is further contemplated that exercise modules 101 and interface devices 105 may communicate with one another via any suitable mechanisms, including, but not limited to, wireless connectivity protocols. FIG. 1 depicts one of each of exercise module 101 and interface device 105. It is understood, however, that any number of exercise modules 101 and associated interface devices 105 may be used in the system 100. It is further contemplated that exercise modules 101 may include multiple modules 101 working in conjunction with one another, and that various modules 101 may be substantially different from one another. The exercise modules 101 and interface devices 105 comprise the portions of the exercise system 100 that a consumer (e.g., athlete, student, coach, recruiter) interacts with. This disclosure first describes these aspects of the system, followed by disclosure of the remainder of the system, including the servers, and exemplary methods of use.

Exercise Modules

Figure 2:
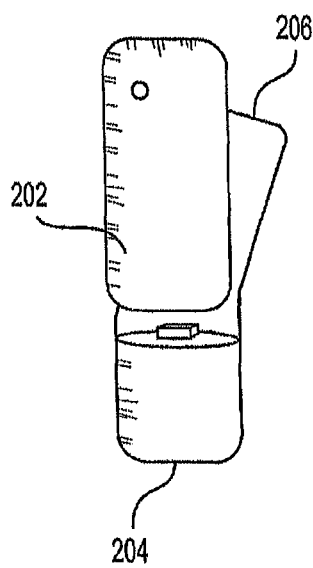

An exemplary exercise module 101 is shown in FIG. 2. FIG. 2 shows an exemplary exercise module 101 that may be attached, coupled, or otherwise secured by various means to different kinds of equipment that an athlete, consumer, or user might use during exercise or other physical activity. In some embodiments, exercise module 101 may include an electronics module 202 and a detachable power module 204, such as, e.g., a battery. However, it is also contemplated that electronics module 202 and power module 204 may be integral. The particulars of electronics module 202 will be described in further detail below. Power module 204 may be configured as a rechargeable module, a single-use module, or another suitable power module. In one embodiment, power module 204 may be a lithium polymer (LiPo) battery. A covering 206 may be configured to extend around an entirety of exercise module 101. In some embodiments, covering 206 may be formed of a flexible material (e.g., a rubber-like material) to secure electronics module 202 to power module 204. Covering 206 additionally may include other mechanisms for, e.g., fastening to various types of exercise equipment or clothing. Exercise module 101 may be a portable measuring device that is configured to use a system of different mounts or attachments for different pieces of equipment. Thus, exercise module 101 may be a single device configured to serve many purposes.

Figure 3:
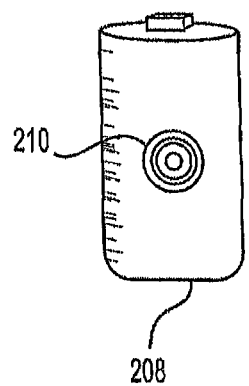

FIG. 3 illustrates an exemplary power module 208 that may be coupled or otherwise integrated with electronics module 202. In some embodiments, power module 208 may be configured for wireless/inductive charging. In some embodiments, power module 208 may include a light source 210 that is configured to activate when power module 208 is charging, among other reasons. Power connector 214 may be configured to deliver energy to power module 212.

Figure 4:
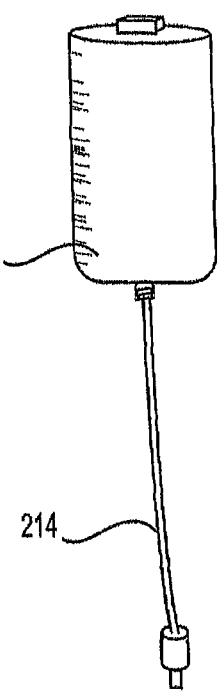

FIG. 4. Illustrates a power module 212 that may be substantially similar to power module 204, except that power module 212 may be configured to accept a power connector 214, such as, e.g., a USB, micro USB, Firewire, AC power connector, DC power connector, or another suitable power connector.

FIGS. 5-7 illustrate various views of exercise module 101 having electronics module 202 and power module 204. In some embodiments, exercise module 101 may have a recess or other groove disposed around its perimeter. That is, electronics module 202 may have a recess 210 disposed around its perimeter, and power module 204 may have a recess 212 disposed around its perimeter. Recesses 210 and 212 may align with one another so as to form a continuous recess, and may be configured to couple with a protrusion or other suitable mating feature disposed on covering 206 (referring to FIG. 2). It should be noted that other suitable mating arrangements between exercise module 101 and covering 206 are also contemplated. For example, a protrusion may extend around the perimeter of exercise module 101 and may be configured to mate with a groove in covering 206.

Figure 8:
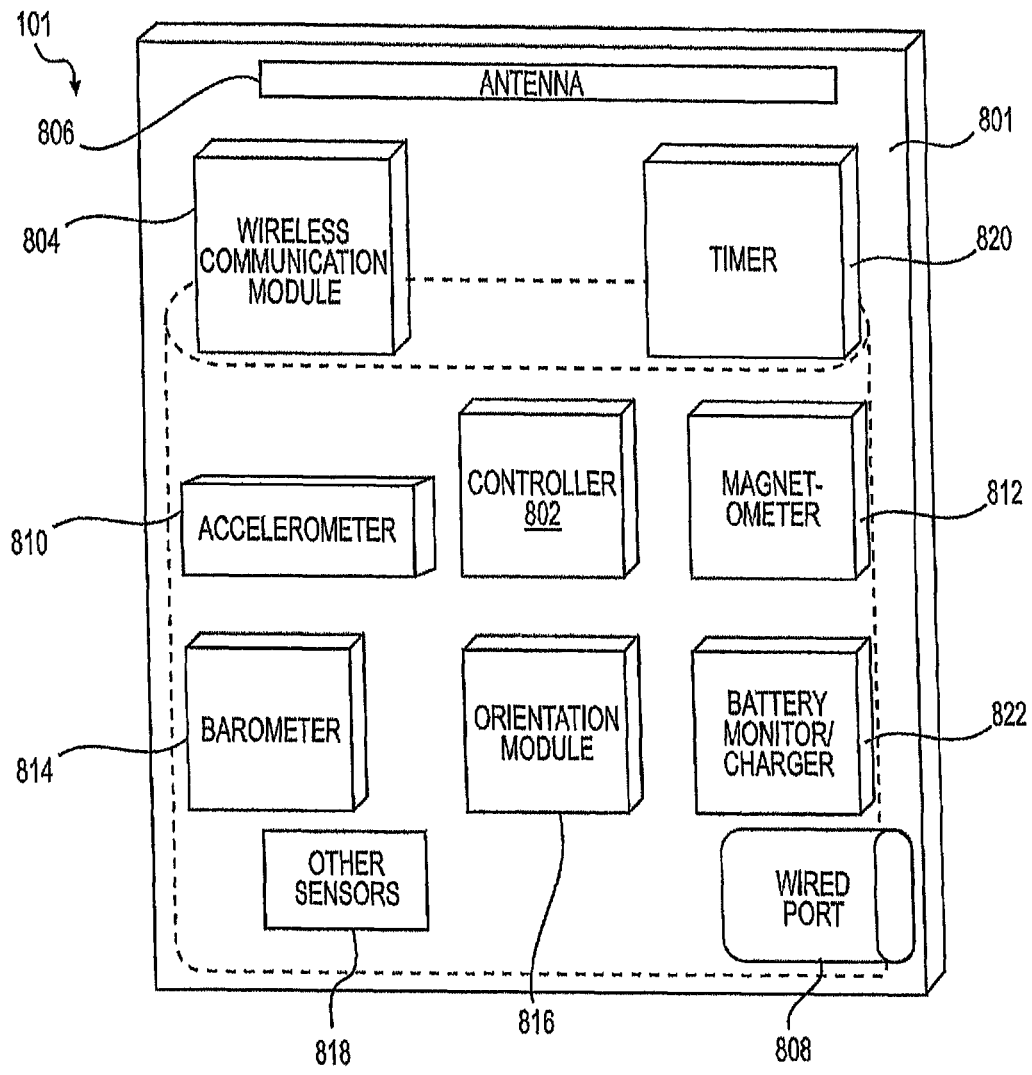
FIG. 8 is a schematic view of the exercise module of FIGS. 1-6.

FIG. 8 is a schematic view of exercise module 101 depicting exemplary components that may be provided within electronics module 202. In some embodiments, electronics module may include a substrate 801, such as, e.g., a printed circuit board, among other suitable substrates. Exercise module 101 may include passives, crystals and other ancillary parts required by the particulars of the design. Exercise module 101 also may include a controller 802. Controller 802 may include one or more processors coupled to one or more non-transitory computer readable storage devices (not shown) that may perform any of the actions described herein, storing collected data, and transmitting the collected data to interface device 105, and/or server system 106 (to be described herein) via electronic network 100.

Controller 802 may be coupled to a wireless communication module 804 and an antenna 806. Wireless communication module 804 may be configured to transmit data from controller 802 to, e.g., interface device 105, or otherwise over network 103. Wireless communication module 804 may be configured to transmit information over one or more wireless modalities, such as, e.g., Bluetooth, Bluetooth low energy (BLE), infrared, cellular networks, and wireless networks, among others. Antenna 806 may be any suitable device configured to assist wireless communication module 804 in data transmission and/or amplification. A wired port 808, such as, e.g., a USB, micro USB, Firewire, or other suitable port may couple exercise module 101 to a third party device, such as, e.g., a computer, phone, tablet, or the like, to allow exercise module 101 to transmit and receive data in addition or alternative to the discussed wireless mechanisms. Thus, exercise module 101 may include one or more forms of network connectivity for storage and sharing of collected data.

Exercise module 101 may include a plurality of sensors coupled to controller 802 such as, e.g., an accelerometer 810, a magnetometer 812, a barometer 814, an orientation module 816 (e.g., a three axis gyroscope), and other sensors 818, including, but not limited to, a thermocouple, a humidity sensor, a heart rate monitor, and an altimeter, among others. In one embodiment, high-precision MEMS sensors and electronics may be utilized to potentially eliminate or reduce error typically associated with evaluation mechanisms utilizing human judgment, tape measures, and hand recording, among other techniques. In some embodiments, exercise module 101 may include a GPS tracker. In some embodiments, exercise module 101 may function as a pedometer.

In some embodiments, exercise module 101 may include signal processing capabilities to amplify collected sensor signals and filter noises and other artifacts, among other functionalities.

Exercise module 101 also may include a timer 820. Timer 820 may be utilized for data tracking and analysis. For example, timer 820 may be utilized to associate certain athletic activities with a discrete time, and can be utilized in calculations having a time component, such as, e.g., speed and acceleration, among others. In some embodiments, timer 820 may be a real time clock (RTC). Those of ordinary skill will recognize that any suitable time tracking device or component may be used as timer 820. It is further contemplated that timer 820 may be utilized in other suitable manners.

In some embodiments, an exercise module 101 may track and report exercise, training and physical movement assessments. Exercise module 101 may be reconfigurable so as to be coupled with various exercise devices, such as, e.g., barbells, exercise balls, and boxing gloves, among others, and third party supporting electronics, such as, e.g., mobile phones, tablets, and personal computers, among others. Thus, in use, a given exercise module 101 may be attached to a piece of sports equipment, testing device, or body part using one or more attachments. Exercise module 101 can therefore be utilized to measure parameters relating to athleticism and exercise.

Figure 9:
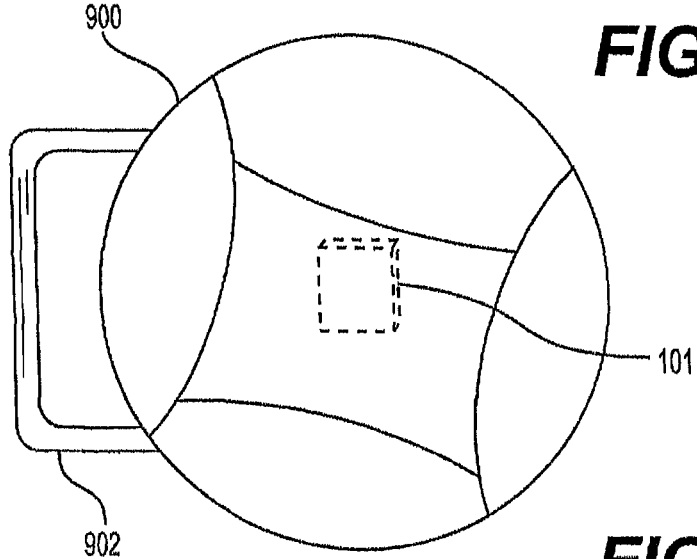
FIG. 9 illustrates a ball according to another embodiment of the present disclosure.

A ball 900 (e.g., a medicine ball) is shown in FIG. 9. Ball 900 may have an exercise module 101 embedded therein. In alternative embodiments, exercise module 101 may be coupled to an outer surface of ball 900, or may be secured, coupled, or otherwise associated with ball 900 in another suitable manner. In some embodiments, ball 900 may be an exercise ball or a specialty sports ball, such as, e.g., a basketball, a baseball, or a soccer ball, among other suitable sports balls. Ball 900 may be formed from fabric, leather, or vinyl, among other materials, and may be filled with filling materials. The filling may be formed from resilient materials, such as, e.g., polyester batting and shredded rubber, or other suitable filling materials. In some embodiments, ball 900 may be weighted to assist in training or conditioning.

One or more handles 902 may be coupled to ball 900 to allow a user to hold the ball 900 at arm's length without having to squeeze or otherwise handle ball 900. In one embodiment, two or more elastic handles 902 may be mounted on opposite sides of ball 900 to allow holding the ball 900 at arm's length without using muscles to squeeze the ball 900. In some embodiments, muscle activation utilized to squeeze ball 900 itself may be undesirable as it may interfere with a given analysis. In yet another embodiment, handles 902 may be rigid. In one embodiment, ball 900 may be a kettlebell. In some embodiments, handles 902 may be flexible and/or elastic members that are stitched, sewn, or are otherwise coupled to the outer surface of ball 900. In one embodiment, a circumference of ball 900 may include a plurality of handles 902. For example, a first portion of the circumference may form a first handle 902, and a second portion of the circumference may form a second handle 902. In one embodiment, four handles 902 are formed along a circumference of ball 900. The four handles 902 may include two pairs of differently sized handles to accommodate different sized hands (e.g., a narrow set of handles 902 for youth users, and a wider set of handles 902 for adult users). In an alternative embodiment, portions of ball 902 may be recessed such that an outer circumference of ball 900 forms one or more handles 902. Handles 902 may be stretched away from the outer surface of ball 900 to facilitate a user gripping the ball 900. Once released, handles 902 may elastically retract back to the outer surface of ball 900.

In some embodiments, ball 900 may be laced shut, zippered, secured with a hook and loop fastening mechanism, or be otherwise accessible and secured to allow placement and removal of exercise module 101. In an alternative embodiment, the exercise module 101 may be sewn or otherwise permanently coupled to the ball 900. In some embodiments, exercise module 101 may have a secondary cell configured to recharge inductively. A removable exercise module 101 may be configured to include interchangeable parts so that it may be fitted with other components. For example, electronics module 202 and power module 204 (referring to FIGS. 2-7) may form two discrete portions of exercise module 101. In some embodiments, power module 204 may include a power attachment containing a primary or secondary cell, and may be fitted with a strap or other fastening mechanism for inserting and removing the exercise module 101 (or power module 204 only) into the ball 900. In embodiments utilizing a secondary cell for power, the power module 204 can be fitted with a USB (or other suitable) recharging cable for providing power. In some embodiments, exercise module 101 and/or power module 204 may be charged in situ when placed inside ball 900. For example, ball 900 may contain a piezoelectric film or similar material configured to harvest energy while the ball 900 is in motion to power the ball 900 and/or recharge a secondary cell within the ball 900. In some embodiments, ball 900 may have a charging port electrically coupled to power module 204 for charging exercise module 101. In this manner, a user may be able to plug, connect, or otherwise associate ball 900 with a charging source (e.g., a wall outlet or other suitable charging station).

As alluded to above, ball 900 may be formed as any suitable type of sports ball, such as, e.g., a baseball, football, basketball, soccer ball, lacrosse ball, and medicine ball, among others. Ball 900 also may be another suitable ball having, e.g., a six-inch diameter, a nine-inch diameter, a twelve-inch diameter, or another suitable diameter, dimension, or configuration depending on the application. Additionally, ball 900 may have any suitable mass depending on the strength of the user.

Figure 10:
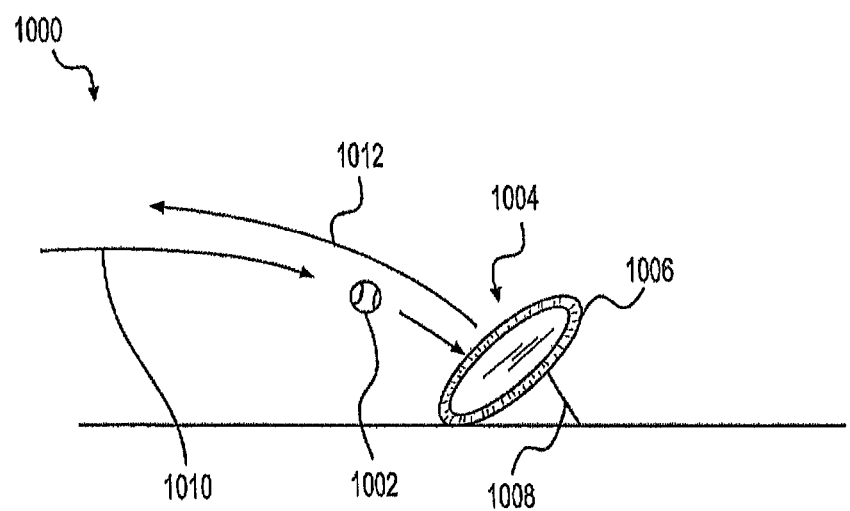
FIG. 10 illustrates an exercise system according to another embodiment of the present disclosure.

An exercise system 1000 is shown in FIG. 10. Exercise system 1000 may include a ball 1002 housing an exercise module (not shown, e.g., exercise module 101), and a return device 1004. Return device 1004 may consist of a return surface 1006 (e.g., an elastic surface or a net) and a support 1008. A user may throw ball 1002 or another suitable object housing an exercise module toward return device 1004. Ball 1002 may approach return device 1004 along a path 1010, and may return to the user along path 1012. In some embodiments, return device 1004 may be configured such that paths 1010 and 1012 approximate one another, or otherwise be substantially similar. However, it is contemplated that return device 1004 may return ball 1002 to the user along a deviated path 1012. Return device 1004 may be any suitable device configured to return a ball or other object 1002 back to a user, such as, e.g., a trampoline, baseball return net, or similar device. Return device 1004 may be configured to stand alone, or may be, e.g., wall-mountable. In some embodiments, return device 1004 may be configured to include an exercise module 101.

Figure 11:
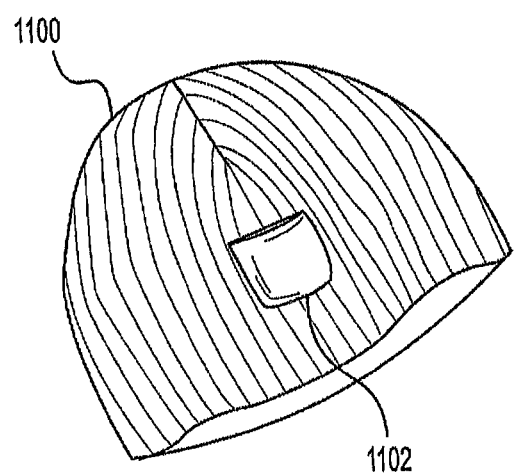
FIG. 11 illustrates an article of clothing (e.g., a hat) according to another embodiment of the present disclosure.
Figure 12:
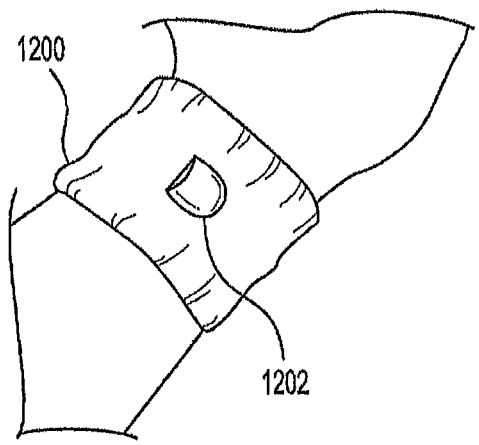
FIG. 12 illustrates a first limb or joint attachment according to another embodiment of the present disclosure.

A hat 1100 having a compartment 1102 for an exercise module (not shown) is illustrated by FIG. 11. Although FIG. 11 depicts that an exercise module 101 may be associated with a hat 1100, those of ordinary skill will recognize that exercise module 101 may be associated with any suitable clothing article, such as, e.g., shirts, shorts, jerseys, socks, or the like. Hat 1100 may be configured to monitor head position, orientation, and/or movement. In some embodiments, hat 1100 may be utilized for tracking head movements during sporting events, such as, e.g., during a golf swing. In some embodiments, hat 1100 may be used to approximate the top of the spine of a test subject/athlete/exerciser to monitor spine alignment. In some embodiments, a different adapter may be utilized to more closely approximate and measure alignment at the top of the spine. Hat 1100 may be any suitable hat such as, e.g., a baseball cap or a seamed cap (e.g., a beanie). That is, athletes that wear hats during the normal course of play or performance may utilize hat 1100, including, but not limited to baseball players, golfers, and runners, among others. In some embodiments, exercise modules may be incorporated into other types of headwear, such as, e.g., skull wraps, headbands, and helmets, among others. For example, skull wraps, headbands, and helmets may be utilized by tennis players, football players, hockey players, or other athletes that do not typically wear traditional hats during play. Alternatively, athletes that do not typically wear hats during regulation play may utilize a hat 1100 during practice or non-game situations to evaluate performance. In some embodiments, hat 1100 may be formed as headwear such as, e.g., ear clips, headbands, headphones, or other suitable headwear.

A wrist or other limb/joint attachment 1200 having a compartment 1202 for an exercise module (not shown) is illustrated by FIG. 11. Wrist attachment 1200 may be a wrist band, bracelet, or other suitable attachment that allows an athlete, user, or test subject to be monitored for performance directly, rather than indirectly by, e.g., monitoring the equipment to which the athlete, user, or test subject imparts force or motion. Wrist attachment 1200 may have a portion configured to substantially wrap around a user's wrist, such as, e.g., an elastic sleeve. In one embodiment, wrist attachment 1200 may be utilized to analyze swing patterns and movements in, e.g., racket sports players (e.g., tennis, squash, badminton, and table tennis), golfers, baseball players (e.g., to analyze batting swings), lacrosse players, field hockey players, ice hockey players (e.g., to analyze shot or passing mechanics), cricket players, or in other sports where the athlete controls a swinging or stick-like object. In some embodiments, wrist attachment 1200 may be used alone or in conjunction with other exercise modules 101 to analyze throwing motions, such as, e.g., for baseball players (all positions), or football players (e.g., quarterbacks). In one embodiment, wrist attachment 1200 may be used to analyze basketball skills such as, e.g., dribbling and jump shot mechanics, among other skills.

Figure 13:
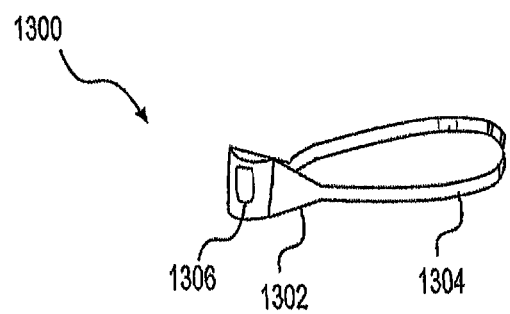
FIG. 13 illustrates a body attachment according to another embodiment of the present disclosure.

A body attachment 1300 having a compartment 1306 for an exercise module (not shown) is illustrated by FIG. 13. Body attachment 1300 may be, e.g., a belt (e.g., a weightlifting belt)

with a central section 1302 and an elongate strap portion 1304. Central section 1302 may be configured to support the back or spine of a user, and strap portion 1304 may wrap around the body of the user. In one embodiment, compartment 1306 and exercise module 101 (not shown in FIG. 13) may be placed to approximate the position of the spine or sacrum. It is further contemplated that compartment 1306 and exercise module 101 may be located at another suitable location.

In an alternative embodiment, spinal movements and positioning may be approximated by incorporating exercise module 101 into a pocket on the back of workout pants, tights, compression shorts, a T-shirt, or similar sports gear.

Compartment 1306 may be disposed close to the user's center of gravity and may be aligned with their lower spine. After placing the exercise module 101 into compartment 1306, and after the user positions body attachment 1300 into the appropriate position, exercise module 101 can be aligned or calibrated electronically. For example, a user wearing body attachment 1300 may stand up straight, and a button may be selected on the exercise module 101 or interface device 105 to align or calibrate the exercise module 101. For example, an "Align!" button may be pressed within the graphical user interface of a computing device application. Body attachment 1300 may allow for the position of the lower spine to be monitored to evaluate technique and movements. In some embodiments, transverse training may be implemented for golfers, baseball batters, and baseball pitchers, among others.

In another embodiment, body attachment 1300 may monitor and analyze form during the performance of various exercises, such as, e.g., push-ups. For example, when performing pushups, body attachment 1300 may assist in detecting poor form such as, e.g., a sagging posterior, a lifted posterior, and improper neck positioning, among others. Body attachment 1300 also may be used alone, or in conjunction with other exercise modules 101 placed in various locations for running stride analysis and lower body strength evaluation (e.g., through plyometric, static, and countermove jumps), among other types of evaluations.

In one embodiment, body attachment 1300 may be utilized in combination with wrist attachment 1200 for, e.g., a full golf swing analysis and/or other effort calculations. In some embodiments, body attachment 1300 may be utilized in combination with hat 1100 (described with reference to FIG. 11).

Figure 14:
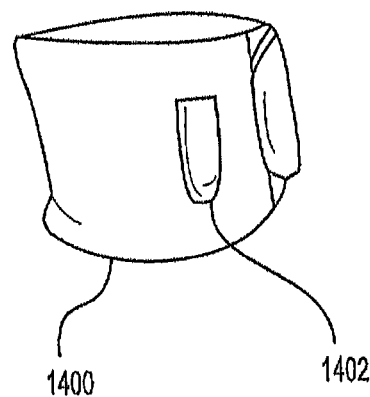
FIG. 14 illustrates another limb or joint attachment according to a further embodiment of the present disclosure.

An ankle or other limb/joint attachment 1400 having a compartment 1402 for an exercise module (not shown) is illustrated by FIG. 14. Ankle attachment 1400 may be an elastic sleeve, ankle band, an elongate band configured to wrap around and be secured to an ankle, or other suitable attachment that allows direct performance monitoring of an athlete, user, or test subject. In one embodiment, ankle attachment 1400 may be utilized to analyze leg movements in athletes. In some embodiments, ankle attachment 1400 may be used to tailor specific analysis of, e.g., kick-boxers, soccer players, and other athletes or users.

Figure 15:
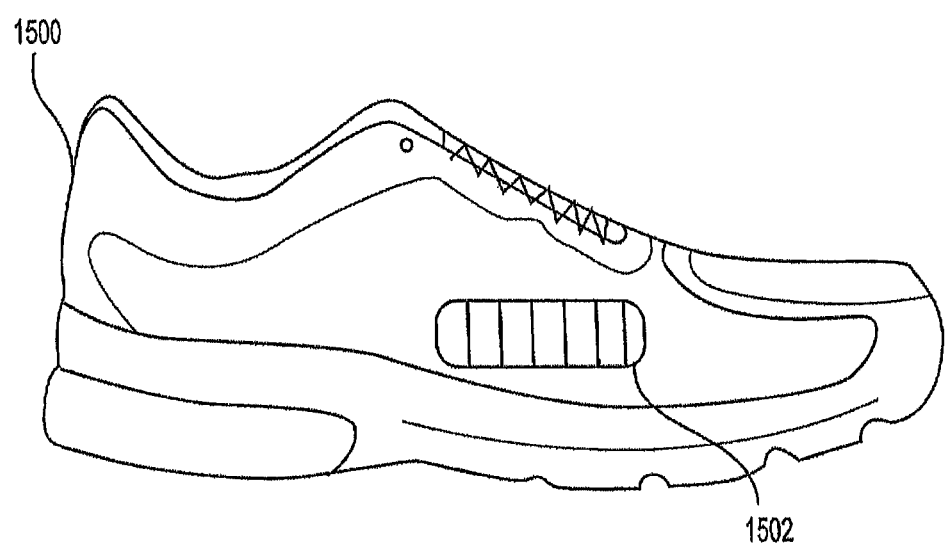
FIG. 15 illustrates footwear according to another embodiment of the present disclosure.

Footwear 1500 having a compartment 1502 for an exercise module (not shown) is illustrated by FIG. 15. Footwear 1500 may be an athletic shoe, sneaker, or other suitable type of footwear that allows direct performance monitoring of an athlete, user, or test subject. In some embodiments, footwear 1500 may include sport-specific footwear, such as, e.g., ski boots, ice skates, among others. Footwear 1500 may be utilized alone or in combination with, e.g., body attachment 1300 or other suitable attachments for run stride analysis, effort calculations, or other applications. In some embodiments, an exercise module 101 (not shown in FIG. 15) may be installed within footwear 1500, laced on top of footwear 1500, clipped to side of footwear 1500, or otherwise coupled to footwear 1500.

Figure 16:
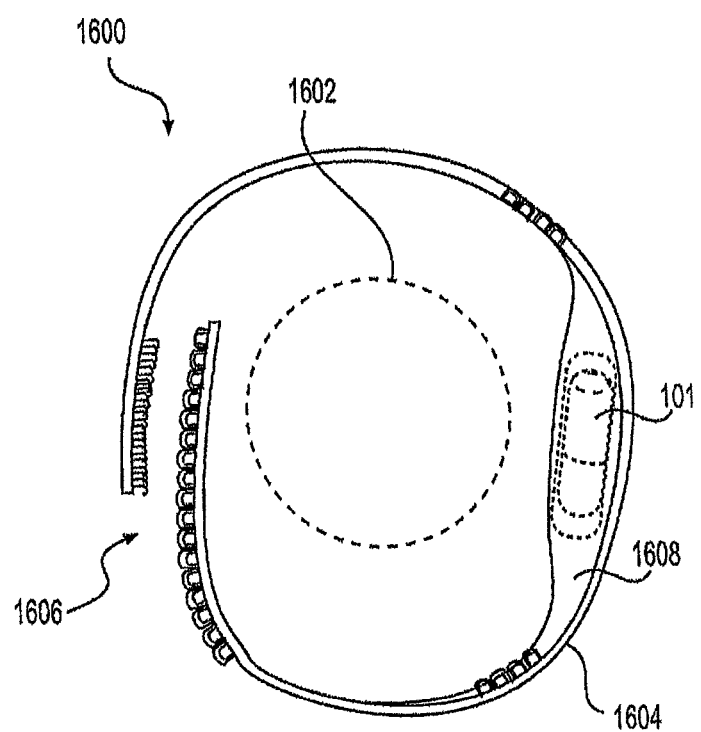
FIG. 16 illustrates an exercise system according to another embodiment of the present disclosure.

An exercise system 1600 is shown in FIG. 16. Exercise system 1600 may include a barbell 1602 and an attachment 1604 configured to wrap around barbell 1602. In alternative embodiments, barbell 1602 may be substituted by dumbbells, kettlebells, weighted bars, smith presses, and other weighted exercise implements. Attachment 1604 may include a fastening mechanism 1606, such as, e.g., Velcro, hooks, clips, adhesives, or the like. Attachment 1604 may be formed from neoprene or another suitable material. Attachment 1604 also may include a compartment 1608 for holding exercise module 101. Attachment 1604 may be configured to wrap around a center of the barbell 1602 to allow for the monitoring of work performed, rate of force development, force applied, bar speed, and acceleration, among other parameters. In one embodiment, the differences in left-side versus right-side strength of a user can be ascertained and observed by exercise system 1600. For example, because attachment 1604 (and exercise module 101) is fixed to the barbell 1602, exercise module 101 may use gravity as a reference, and thus any swinging of the observed gravitational vector may provide information of the tilt of barbell 1602. Such tilt information may be analyzed to determine if the user is unevenly lifting barbell 1602 as a result of, e.g., uneven strength and conditioning. In some embodiments, exercise module 101 itself may include a dial or other mechanism to enable a user to quickly adjust the weight associated with the barbell 1602 without necessarily accessing interface device 105. In a gym or test environment, the exercise module 101 could stay at a given station and be programmed to give a preset or programmed weight value to exercise system 101. Then, other stations may be set up in the same gym or test environment, each having a preset or programmed weight corresponding to the exercise device that it is associated with. Exercise system 1600 also may measure, calculate, or determine the speed and motion of barbell 1602 for effort outputs, repetitions, and sets, among other parameters. In some embodiments, exercise system 1600 may be utilized for grading of Olympic lifts.

Figure 17:
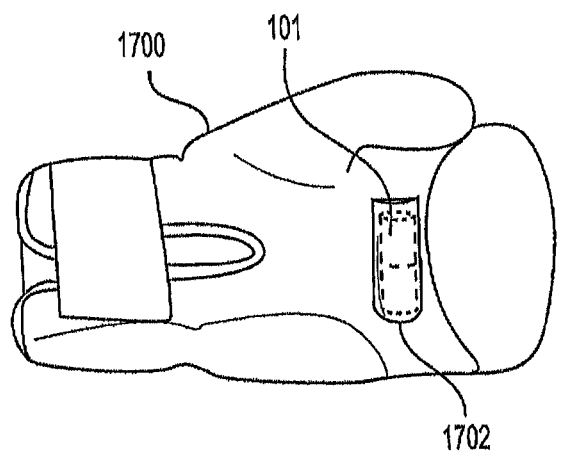
FIG. 17 illustrates a glove according to another embodiment of the present disclosure.
Figure 18:
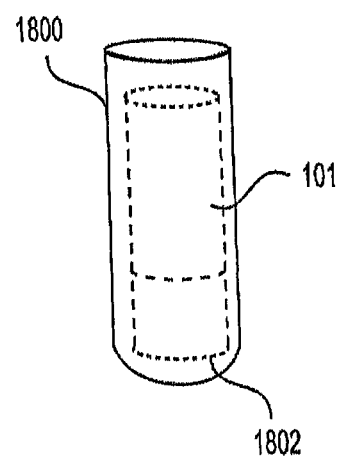
FIG. 18 illustrates a grip hose according to another embodiment of the present disclosure.

A glove 1700 having a compartment 1702 for an exercise module 101 is illustrated by FIG. 17. In some embodiments, glove 1700 may be a fighting glove, such as, e.g., a boxing or mixed martial arts (MMA) glove. In some embodiments, compartment 1702 may be a grip hose that is installed within glove 1700. It is also contemplated that glove 1700 may be a non-fighting glove, such as, e.g., a skiing glove, winter glove, hockey glove, baseball glove, or other type of glove. A grip hose 1800 is shown in FIG. 18 having a compartment 1802 for an exercise module 101. Grip hose 1800 may be configured to be installed in any suitable glove, such as those described with reference to FIG. 17.

An exercise system 1900 is shown in FIG. 19. Exercise system 1900 may include an elongate surface 1902 formed from a metal or other suitable material. In one embodiment, elongate surface 1902 may be formed from one or more metals such as, e.g., stainless steel, titanium, or the like. A sensor module 1904 may extend transversely from elongate surface 1902. In one embodiment, sensor module 1904 may include stress strain gauges, or other suitable sensors. In one embodiment, a glass frit (or any suitable bonding or adhesive material) may be used to mount a silicon strain gauge to elongate surface 1902. In one embodiment, a stress strain gauge may be formed from brass and/or foil, among other suitable materials. Sensor module 1904 also may be configured to link with an exercise module 1906 that may be substantially similar to exercise module 101 described with reference to FIGS. 1-7. It should be noted that functionalities may be allocated between sensor module 1904 and exercise module 1906 in any suitable combination. For example, a battery or power module may be disposed in only one of sensor module 1904 and exercise module 1906.

Exercise system 1900 may include one or more apertures 1908 that are configured to connect exercise system 1900 to ropes, bands, or other linkages. Exercise system 1900 may be configured to insert into the ropes of, e.g., a suspension training system so that effort can be quantified and tracked, and force measured. For some exercises, motions can also be monitored for technique. In some embodiments, exercise system 1900 may be combined with the body attachment 1300. The combination of exercise system 1900 and body attachment 1300 may help monitor technique and effort to help maintain correct body alignment. A mobile application can display a graphical representation (described in further detail below) of the user so that the user can self-spot while performing some exercises. This may help users maintain proper alignment in exercise systems such as, e.g., suspension training systems where misalignment is commonplace.

Exercise system 1900 also may be used with exercise bands (e.g., TheraBands) to facilitate determination of forces exerted during use. This may allow consumers to quantify the effort they exert while using such bands. Thus, the exercise system 1900 may allow for accurate measurements of applied forces and work with elastic therapy bands or similar implements, rather than relying on feel or inaccurate measurements and factors. The use of exercise bands with exercise system 1900 may allow for quantified movements with a known force while using a low mass. Thus, high forces may be used during exercise with little to no risk of momentum due to mass affecting quantitative analysis (which may occur during exercises using relatively heavy weights or balls). Users may compensate for heavy weights by attempting to decelerate the heavy weight, which may cause injury to joints. In some embodiments, exercise system 1900 may allow for the prescription of torque benchmarks or limits during rotational exercises, such as, e.g., during therapy for a rotator cuff injury.

In some embodiments, exercise system 1900 may be coupled to various cable or pulley training systems. Aperture 1908 may be coupled to the cable via, e.g., a linkage or carabiner 1910 (shown in FIG. 20), and another aperture 1908 may be coupled to a handle. In another embodiment, one aperture 1908 may be coupled to an elastic band while another aperture 1908 may be coupled to a handle of the elastic band. Thus, actual force measurements may be calculated as a user performs exercise using the cable system (e.g., bicep curls, triceps pushdowns, lat pulldowns, and rows, among other exercises). In one embodiment, exercise system 1900 may be about 50 mm in length, although other suitable dimensions are also contemplated.

Figure 21:
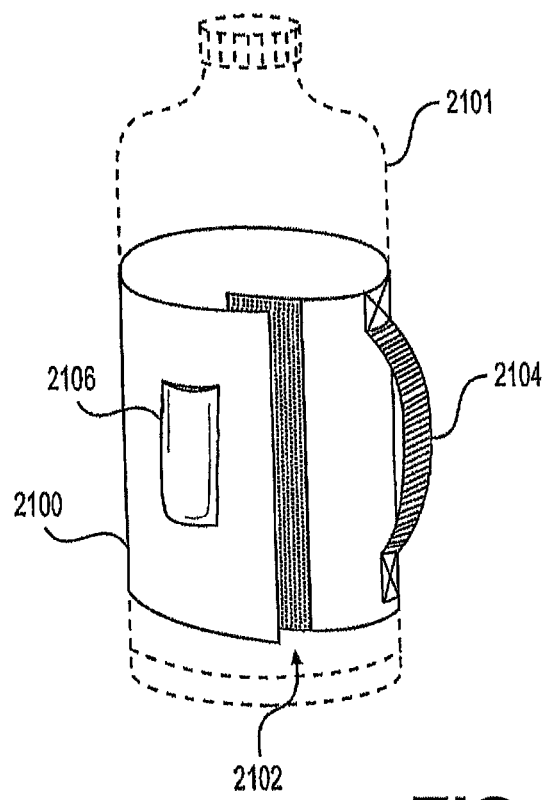
FIG. 21 illustrates an exercise system utilizing a found item according to an embodiment of the present disclosure.

An attachment 2100 having a compartment 2106 for an exercise module (not shown) is illustrated by FIG. 21. Attachment 2100 may have a fastening mechanism 2102, such as, e.g., Velcro, hooks, clips, adhesives, or the like for securing itself around a found, or otherwise suitable object 2101. In some embodiments, the found object 2101 may be a large water bottle (e.g., five gallon water bottles, among other sizes), a pail (e.g., a five gallon pail), or other objects such as, e.g., rocks, tree trunks, fire wood, or other weighted objects. In some embodiments, the various containers (e.g., water bottles and pails) may be filled with a liquid to increase their respective weights and the intensity of the exercise. Attachment 2100 also may include one or more handles 2104. Thus, attachment 2100 may allow a traveler to carry only an exercise module 101 and an attachment 2100, while still being able to quantify and analyze workouts. In some embodiments, attachment 2100 may be used on business trips, vacations, or in other scenarios where a user is away from a home or regularly-visited gym. In some embodiments, a runner may be able to carry attachment 2100 on a run, yet may be able to perform and quantify various anaerobic exercise intermittently during the run/workout with objects found along the path of the runs, for example.

Figure 22:
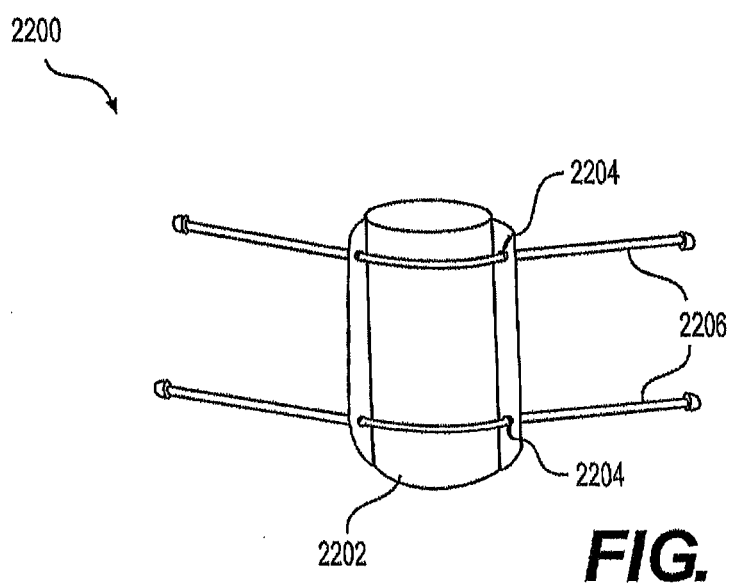
FIG. 22 illustrates an exercise module according to another embodiment of the present disclosure.

An attachment 2200 having a compartment 2202 for an exercise module (not shown) is illustrated by FIG. 22. Attachment 2200 may have a fastening mechanism to secure itself around objects such as, e.g., sticks, clubs, rackets, or other similar devices. As shown in FIG. 22, the fastening mechanism may include a plurality of apertures 2204 and elongate members 2206 that loop or otherwise extend through apertures 2204. Elongate members 2206 may be any suitable elongate member such as, e.g., strings, belts, nylon fasteners, or other suitable elongate members. In some embodiments, elongate members 2206 may be substantially elastic. In some embodiments, apertures 2204 and elongate members 2206 may be substituted for fastening mechanisms such as, e.g., Velcro, hooks, clips, adhesives, or the like for securing attachment 2200 about a desired object.

Figure 23:
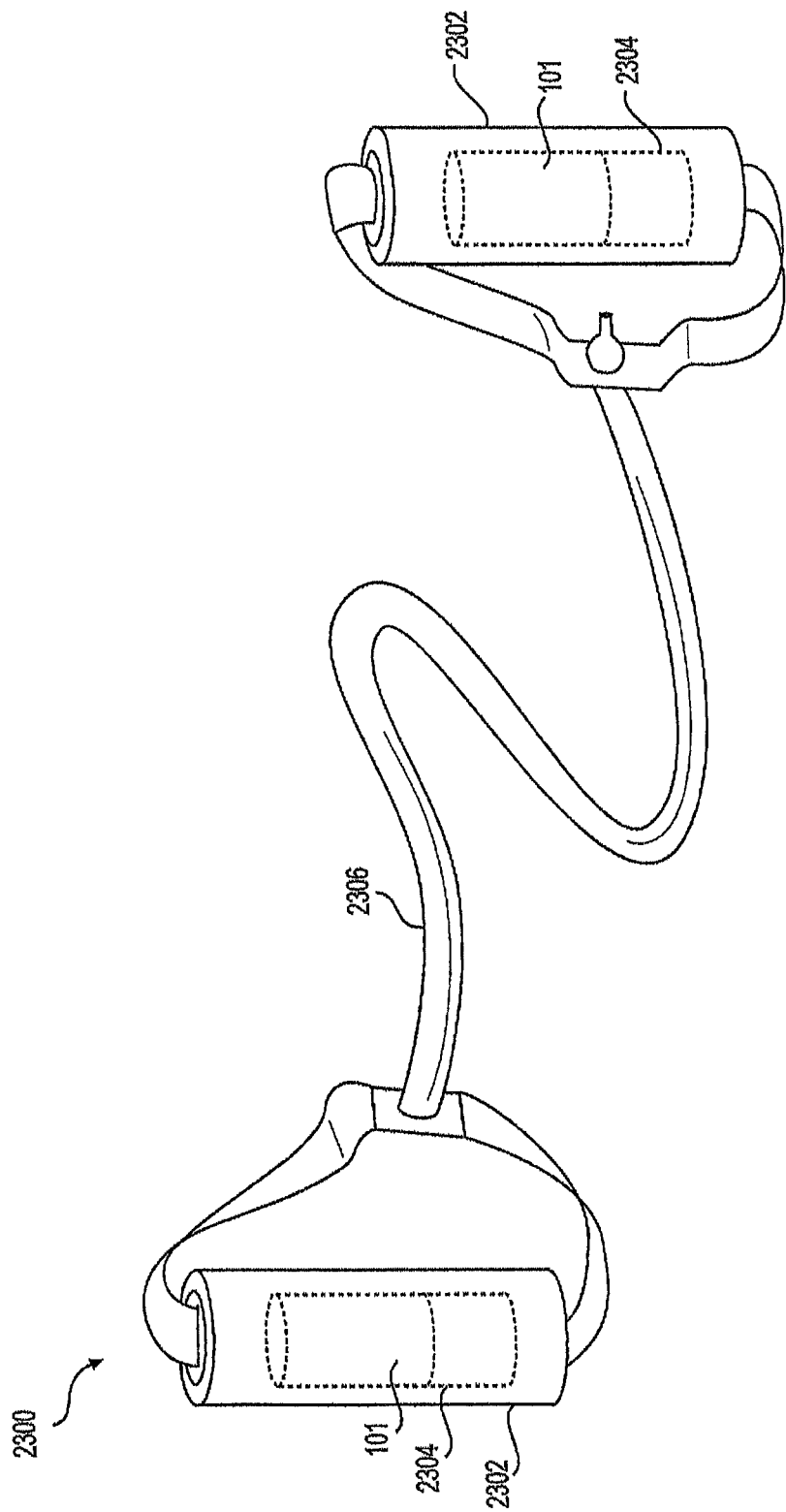
FIG. 23 illustrates an exercise module according to another embodiment of the present disclosure.

An exercise fitness band 2300 is shown in FIG. 23. Fitness band 2300 may include one or more handles 2302 connected by a resistance band 2306. One or more of the handles 2302 may include a compartment 2304 for exercise module 101. It is contemplated that in some embodiments, only one of handles 2302 may include a compartment 2304 or that two handles 2302 of a given fitness band 2300 may include a compartment 2304. It is further contemplated that exercise modules 101 may be removable from handles 2302, or alternatively permanently affixed within handles 2302. It is further contemplated that resistance band 2306 may additionally or alternatively have a compartment for an exercise module 101, or a stress/strain gauge (e.g., sensor module 1904).

It is a significant disadvantage of traditional elastic resistance bands that the user cannot quantify the level of force exerted relative to prescribed exercises or previous results. The inertial sensors in the exercise module 101 can determine how the user moves the handles 2302 and may help determine information about the exercises being performed. In some embodiments, a module extender may use one or more strain gauges to measure the force being exerted by the user. In another embodiment, a separate module that forms a link between the grip handle 2302 and the band 2306 (e.g., exercise system 1900 described with reference to FIG. 19) can be added to measure force. The handles 2302 may be used to evaluate a full range of motion with an accelerometer (e.g., using gravity for a reference) and a gyroscope (or rate of turn the accelerometer). In some embodiments, a magnetometer may be used to facilitate the determination of the path of exercise module 101.

An exercise module 101 may be incorporated into other sports training, testing and exercising devices, such as, e.g., footballs (American), soccer balls, rugby balls, basketballs, wiffle balls, tennis balls, baseballs, golf balls, other projectile type devices used in sport, such as a badminton shuttlecocks or hockey pucks, or devices used to drive a projectile, such as a bat, club, racket, or stick. In one embodiment, an exercise module 101 may be incorporated into an oar to categorize rowing exercises. In one embodiment, exercise module 101 may be coupled to one or more bicycle pedals to report forces applied by a cyclist to the bicycle pedal. In some embodiments, exercise module 101 may be used in rowing exercises (e.g., in boats or in stationary rowing machines). In some embodiments, a strain gauge or similar device may be coupled to the foot rests (e.g., stretchers) of a boat (rowing shell) or ergometer with sliding seats to measure the rowing force exerted by a crew member or user. A coach or other interested party may compare the output and synchronization of crew members in boats with multiple rowing stations. In some embodiments, strain gauges may be fitted to oars (or handles of an ergometer). The strain gauges attached to the oars also may allow for the determination of side-to-side balance of each crew member in boats where each crew member pulls two oars.

Embodiments of exercise module 101 may be built as an external device that may be moved between pieces of sports equipment. Exercise module 101 may be temporarily affixed by straps, purpose-built brackets or holders, or fitted to a recess or holder designed as an integral part of the sports equipment. In some embodiments, a strap coupled to exercise module 101 may facilitate removal of exercise module 101 from deep pockets or recesses that may protect exercise module 101 from shock. In some embodiments, exercise module 101 may be waterproof.

Exercise module 101 may be designed as a two-part or multi-part system so that the force imparted to one part of the sports system can be monitored independently of the force transmitted to the second part. For example, a baseball bat and a baseball could be instrumented with complimentary versions of exercise modules 101 described so that the effect of the bat hit upon the ball could be determined. This would be useful for observing the differences in trajectories due to hitting the ball eccentrically, e.g., swings that result in a pop-fly instead of a line drive. In some embodiments, the baseball and baseball bat may communicate with one another via any suitable communication mechanism such as, e.g., Bluetooth, Bluetooth Low Energy (BTLE), or near field communication (NFC). The baseball and/or baseball bat may alternatively communicate with interface device 105, if desired.

In some embodiments, at least some portions of exercise system 101 may be formed from off-the-shelf items that are readily available to hobbyists, and for commercial purposes through such vendors as Sparkfun or Digi-Key. It should be noted that any embodiment of exercise module 101 may be used in combination with one or more other embodiments to provide more complete analysis.

Interface Device

In one embodiment, each of the interface devices 105 may include a server, personal computer, tablet computer, mobile device, smartphone, and/or personal digital assistant ("PDA") disposed in communication with electronic network 103. For example, in one embodiment, each of interface devices 105 may be a touchscreen enabled device, such as an Apple iPad, Samsung Galaxy, Amazon Kindle, Microsoft Surface, or any other equivalent or similar device. Each of interface devices 105 may have a web browser, mobile browser, or other suitable application installed for receiving and displaying content from web servers. Thus, each of the interface devices 105 may be configured to receive and display data that is received and processed over electronic network 103. For example, interface device 105 may receive output from the electronic network and display it to the user. The output may be exercise data or other graded and scaled data.

Server Systems

As shown in FIG. 1, a plurality of server systems 106, a browser web server 114, and/or a mobile web server 116 also may be disposed in communication with electronic network 103. In one embodiment, server systems 106 may be configured to receive data from exercise module 101 and/or interface device 105 over electronic network 103. Any of the devices or functionality of server systems 106, browser web server 114, and/or a mobile web server 116 may be combined together or separated, and may be operated by a single administrative entity, or outsourced to one or more other entities, such as a web hosting entity, web storage entity, and/or cloud computing service.

As shown in the embodiment of FIG. 1, server systems 106 may be a central server, network access server (NAS), or another suitable server that includes a data analyzer 110, which may analyze the received activity data. Specifically, data analyzer 110 may be configured to analyze received activity data, as will be described in more detail below.

Server systems 106 also may include one or more databases 108, where data analyzer 110 may be configured to store the received activity data. Any received data may be stored in the databases 108 in an encrypted form to increase security of the data against unauthorized access.

Server systems 106 also may include an application program 112. In response to a query by the user, the application program 112 may fetch and display data from the databases 108. The application program 112 may implement appropriate security protocols, such as requiring the user to enter logon credentials, so as to appropriately limit access to activity, recruiting, or other data. In some embodiments, server system 106 may track and bill activity and/or analysis to accounts associated with users, athletes, recruiters, sports teams, or other entities.

In some embodiments, exercise system 100 may record data automatically and transmit or communicate the data to devices over a network 103, facilitating longitudinal and cross-sectional studies with little additional effort. This may have the additional benefit of eliminating or reducing manual data entry or transcription, saving time and reducing opportunities for error. In some embodiments, one or more of exercise module 101 and interface device 105 can push collected use data to server systems 106. The data can be associated with the particular user, equipment, date, time and location, among other measured parameters. The collected data may allow coaches (and others who must handle and track data for many users) seamless access for tracking and analysis. Currently, such endeavors require much conscious effort and are prone to error. The properly collected and stored data can be displayed by interface device 105 longitudinally, in panels, or in any suitable format desired by the user, coach, researcher, managed care provider, physical therapist, or other interested party who has been granted access.

As shown in FIG. 1, server systems 106 may be disposed in communication with a browser web server 114 and/or a mobile web server 116. Each of browser web server 114 and/or mobile web server 116 may be configured to interact with interface devices 105, such as to generate appropriate displays to facilitate user interaction with the application program 112. For example, browser web server 114 and/or mobile web server 116 may be configured to generate a window-metaphor based computer user interface on a screen of interface devices 105 or screen (not shown) coupled to the remote server systems 106, or the browser web server 114 and/or mobile web server 116 may generate web pages that are rendered by a browser or application of the interface devices 105. The interface devices 105 and the browser web server 114 and/or mobile web server 116 may communicate with each other using an appropriate encrypted protocol, such as Hypertext Transfer Protocol Secure (HTTPS).

Applicability

Exercise system 100 may be usable by consumers as well as professionals to enable accurate and periodic testing. In some embodiments, exercise system 100 may provide baseline measurement, training measurement, and recording, analysis, and tracking that may allow for the determination of training regimen efficacy. Users of exercise system 100 may interact with the system through exercise tracked by one or more exercise modules 101, and via application software accessed by the various interface devices 105. Features of interactive software applications available on interface devices 105 include, but are not limited to, graphical representations of characters performing exercises, virtual personal trainers, virtual self-spotters, warnings about poor technique/form and potential injury, initiation of text messages or emails with managed care providers, physical therapists, or coaches, interactive communication (e.g., chatting functionality) with third parties, social media uploading and sharing, display of motivational quotes, interactive online communities, reminders to users to exercise, reminders to users to assess for long-term baselines, progress training, and virtual personal trainer calibration, among other functionalities that will be further explored in the disclosure.

Figure 28:
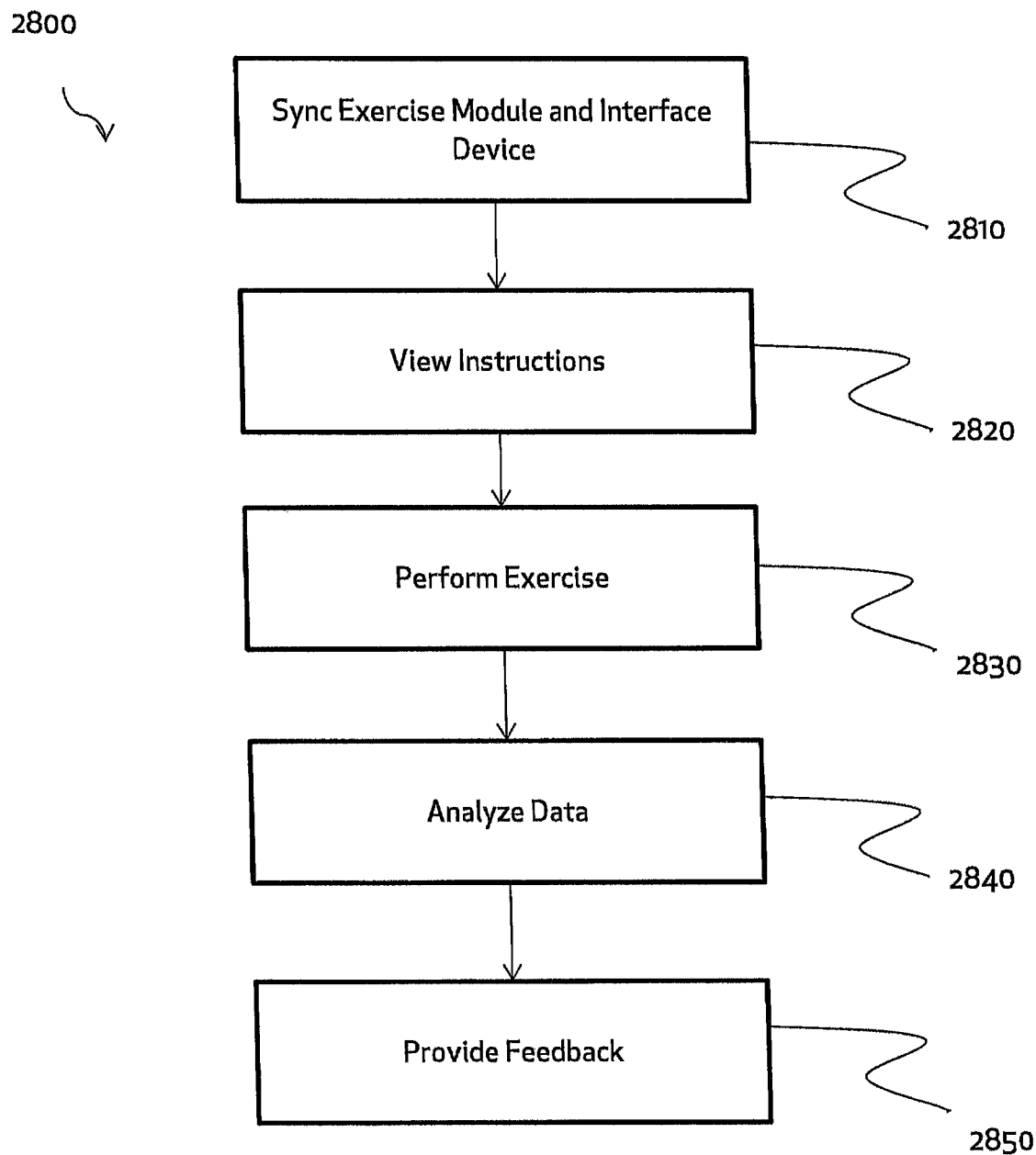
FIGS. 28-30 are flowcharts of exemplary methods according various embodiments of the present disclosure.

FIG. 28 is a flow diagram of a method 2800 for tracking and analyzing exercise. Specifically, as shown in FIG. 28, method 2800 may include syncing exercise module 101 to interface device 105 (step 2810). In some embodiments, a user may use the interface device 105 to configure the application software and exercise module(s) 101 with the required parameters for use during a given session. Different applications may support networks of exercise modules 101 for different uses. For example, a user exercising with elastic therapy bands might use a pair of bands simultaneously, with each band having its own exercise module 101. In some embodiments, exercise bands having different resistance levels may require different analysis and categorization by exercise system 100. Therefore, a user may be required to sync different exercise modules 101 with an interface device 105 at various times during a workout. In one embodiment, interface device 105 may be a device configured to collect data (e.g., wirelessly) from one or more exercise modules 101 located at different stations. Each of the exercise modules 101 located at different stations may be paired to a user's interface device 105 prior to performance of an exercise with an implement associated with the given exercise module 101. A given exercise module 101 may be configured to communicate information specific to its associated exercise module 101 to a synced interface device 105. For example, a given exercise module 101 may be paired to a 25 pound dumbbell. In one embodiment, a commercial gym may have a dedicated exercise module 101 paired to specific implements such as, e.g., dumbbells, barbells, pull-up bars, Smith presses, or other exercise implements.

A user may confirm that exercise module(s) 101 associated with various exercise implements are paired with the user's interface device 105. It is contemplated that unpaired exercise modules 101 may be paired via a standard method for a given interface device 105 as required. In some embodiments, an exercise module 101 may be paired in response to an input by the user (e.g., the user may input a unique code from a given exercise module 101 onto interface device). In another embodiment, exercise modules 101 may automatically pair to a given interface device 105 based on a relative proximity. In yet another embodiment, interface device 105 and/or exercise module 101 may search for one another and prompt the user to verify a connection between the two devices.

Then, the user may select from a list of software applications that a given exercise module 101 can support. The selected software application may then prompt the user for any required inputs, such as, e.g., the mass of the user, the mass of the exercise ball currently in use, and the mass of the barbell to which the exercise module 101 is currently attached, among others. Once the required parameters have been entered, the user may be prompted to select from a list of exercises or test routines available for the given module 101. Alternatively, in some embodiments, exercise module 101 and/or interface device 105 may be configured to recognize that a given exercise has been performed by the user. It is contemplated that the user may enter some or all of this information before or after performing a given exercise. In some embodiments, users may be able to selectively purchase different applications or functionalities associated with a given exercise module 101. For example, a user may be able to purchase one or more of an upper body workout, lower body workout, full body workout, or other type of workout/analysis package. In still other embodiments, users may be able to purchase add-ons, attachments, or other features that are sport specific. It should be noted that in some embodiments, exercise or rehabilitation routines may be pre-programmed onto an exercise module 101 and/or interface device 105 by a therapist, personal trainer, coach, or other entity.

In some embodiments, interface device 105 may include a user login option. The user may simply enter his identifying information before performing an exercise, or may select his identifying from a list, e.g., a scroll bar. In some embodiments the user may be required to enter a passcode. In yet another embodiment, a user may swipe an identifier, e.g., an RFID tag against a reader. In yet another embodiment, the reader may recognize a device (e.g., a mobile phone) carried by the user, such as, e.g., a device configured to communicate a unique identifier via NFC. The reader may recognize the user's identifier, display the user's information on interface device 105, and associate the next performed exercise with the user. In some embodiments, once the user associates his information with interface device 105, interface device 105 may retrieve information, such as, e.g., the user's last similar workout and preload the weight last used, and the number of repetitions and sets performed. In some embodiments, interface device 105 may display a set weight, and number of repetitions and sets to perform. Each preloaded value may be associated with a scroll wheel or other mechanism that allows the user to increment or select a current value. This may save the user from entering old information during each use, and may provide a convenient and easy mechanism for user's to track their incremental progress.

In some embodiments, an interface device 105 may be associated with one or more pieces of exercise equipment at a gym. For example, one interface device 105 may be associated with a bench press while another interface device 105 may be associated with a squat rack. The interface devices 105 associated with a specific piece of equipment may be configured to recognize a user, load the last workout completed by the user, and/or provide a recommendation for a next workout to be performed by the user. The ability to quickly recognize individual users, retrieve previously collected data, and associate new data with individual user accounts may allow for data collection while limiting congestion and promoting the natural flow and activity of users in a gym. This aspect may be particularly beneficial in a collaborative gym setting, such as, e.g., in a CrossFit gym or other group exercise settings.

From step 2810, the method 2800 may proceed to step 2820, where a user may view instructions for performing a selected exercise before performing the exercise. For example, interface device 105 may display an image, set of images, video, graphical illustration, text instructions, or other suitable instructions for performing a given exercise. It is contemplated that in some embodiments, the user may selectively omit this step (by, e.g., selecting an input) and immediately perform a given exercise at step 2830.

Referring to FIGS. 24-26, exemplary implementations of interface device 105 are shown. The implementations shown in FIGS. 24-26 may correspond to step 2820 of method 2800. A graphical representation 2400 may be displayed by interface device 105. In some embodiments, graphical representation 2400 may display an animation with motion illustrating how an exercise to be performed by the user is performed with proper technique/form. In the embodiment shown by FIGS. 24-26, the graphical representation 2400 may be an image of a person holding a virtual ball 2402. In one or more exercises to be performed by the user, a ball, e.g., ball 900 described with reference to FIG. 9, may be movable between two locations on each side of the user. These two locations may be shown on interface device 105 as virtual locations 2406 and 2408. FIGS. 25 and 26 show two different exercises for moving ball 2402 between virtual locations 2406 and 2408 to be performed by the user. For example, FIG. 25 illustrates an exercise 2410 that is different from the exercise 2412 illustrated by FIG. 26. The user may select one of two or more available exercises, and the selected exercise may be illustrated on interface device 105. After viewing the exercise on interface device 105 one or more times, the user may attempt the exercise (step 2830).

From step 2830, data from exercise module 101 may be transmitted to interface device 105 and/or server 106, and analyzed at step 2840. In some embodiments, the analysis may occur locally on interface device 105, or via, e.g., application program 112 (referring to FIG. 1). In some embodiments, application program 112 may simply allow collected data to be accessed later by the user or another authorized party, who may provide feedback to the user at step 2850.

Figure 27:
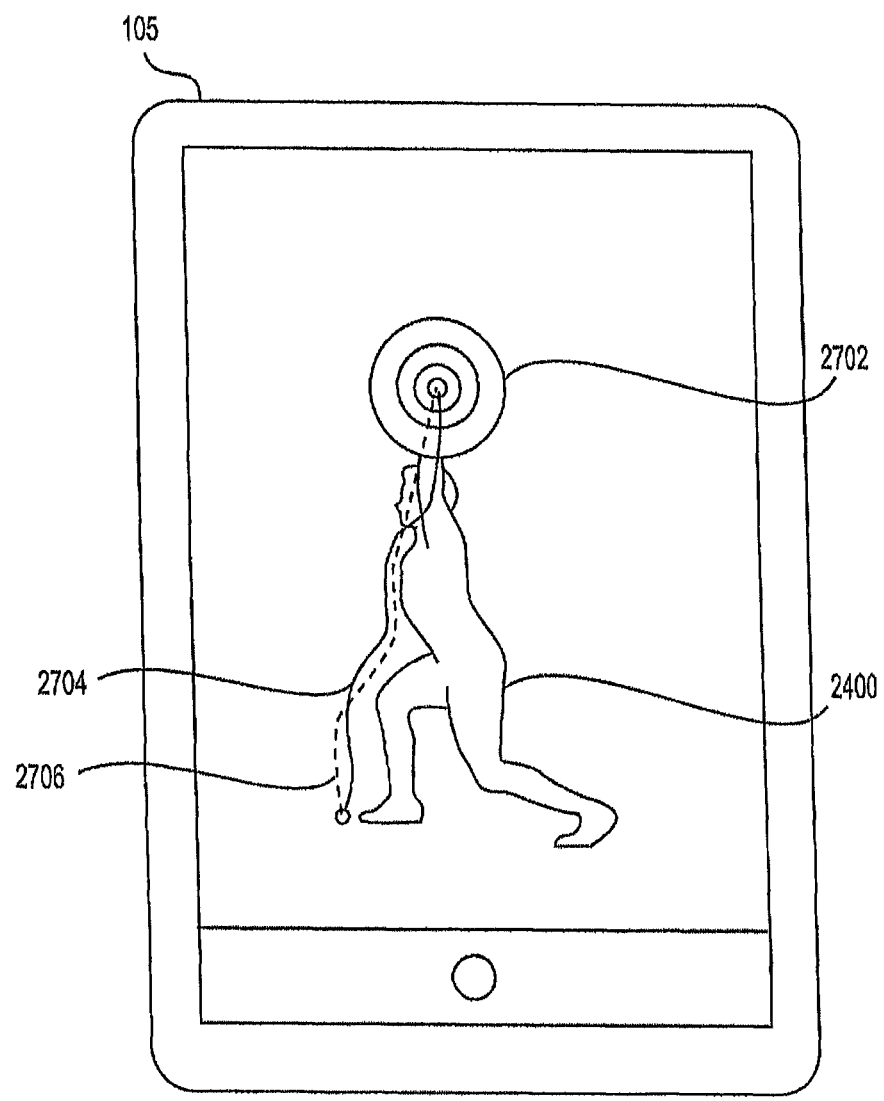

In some embodiments, step 2840 may include an additional analysis step whereby exercise system 100 may overlay parameters of the actually performed exercise onto interface device 105. Thus, in some embodiments, interface device 105 may be utilized to demonstrate a correct form and technique to the user. For example, referring to FIG. 27 graphical representation 2400 is shown performing an Olympic lift (e.g., a clean and press) using a virtual barbell 2702, although any other suitable lift or exercise may be demonstrated. Virtual barbell 2702 may be representative of, e.g., barbell 1602 described with reference to FIG. 16. It should be noted that barbell 1602 may include an attachment 1604 and exercise module 101 (not shown in FIG. 27), allowing the movement of barbell 1602 to be represented on interface device 105 as virtual barbell 2702 during the lift. Interface device 105 may display an ideal path 2706, and graphical representation 2400 may even demonstrate a clean and press showing virtual barbell 2702. The user may then perform an actual lift, e.g., a clean and press, using barbell 1602, and an actual path 2704 of the barbell 1602 may be shown by interface device 105. In some embodiments, actual path 2704 may be displayed contemporaneously with ideal path 2706 so that they may be visually compared by the user. Exercise system 100 also may compare actual path 2704 and ideal path 2706 to provide, e.g., form correction recommendations to the user. Alternatively, the collected data may be used by a coach to provide form recommendations to the user.

In some embodiments, graphical representation 2400 can perform and demonstrate prescribed moves and demonstrate each move from different angles while emphasizing the required force patterns and tempo, if desired.

In some embodiments, exercise system 100 may be configured to measure, record, and display the rate of force development of an athlete using exercise module 101. Exercise system 100 may be configured to operate in conjunction with a remote interface (e.g., interface device 105), and may have logging capability.

Exercise system 100 may be a system for measuring fitness baselines, exercise techniques and volumes, and training efficacy while potentially increasing user motivation, both intrinsic and extrinsic, by allowing remote monitoring of intensity, volume and technique of physical exercise. In some embodiments, users of exercise system 100 may log or share results to social media.

Exercise system 100 may enhance training for and monitoring of strength, power, and speed skills for human performance. Some embodiments of exercise system 100 may measure speed, force, rate of force development, range of motion, strength, and work performed by a user at various angles of motion (e.g., limb displacement and core angle), among others.

Exercise system 100 may display, e.g., via interface device 105, detailed data relating to movements so that analyses of the above parameters and muscle use, muscle development, injuries that restrict load carrying capacity or range of motion, rates of force development, and any of the foregoing with respect to bilateral symmetry can be made by a user. Some embodiments can be used to measure range of motion in unloaded and loaded conditions to facilitate (even remotely) evaluations of injuries and rehabilitation progress.

Exercise system 100 may allow near-real-time display of data observed in raw form, or as processed into user-friendly information (e.g., graphs or tables). These measurements may assist in testing evaluations for, e.g., physiotherapy, conditioning, recruiting, or other applications.

Exercise system 100 may log data and record information about exercise, tests, and performance evaluations by connecting to existing networks for data transmission and storage. In one embodiment, ball 900 (referring to FIG. 9) may communicate via, e.g., Bluetooth to an interface device 105, which can be used to store data, analyze data, warehouse data or re-transmit data (securely, if desired or required) to other networked computers or displays such as NAS (network area storage) or an Apple TV.

Exercise system 100 also may evaluate a user's bilateral symmetry of strength and range of motion and neuromuscular response times. Neuromuscular response times of a user may be determined by calculating the time between a sound (or other triggering signal) and the desired response, such as performing a muscular activity.

In some embodiments, exercise system 100 may be configured to measure one or more of concentric and eccentric muscle use. Concentric muscle use may refer to muscle contraction in which the muscles shorten to generate force. Eccentric muscle use may refer to when muscles elongate while under tension. Thus, exercise system 100 may supply all of the available outputs for multiple movements of a ball 900, for instance, when the ball 900 is being swung back and forth and not released. This information may be particularly valuable in some disciplines, and training in both directions can help prevent injuries. For example, a basketball player's ability to both jump and land may be analyzed. In another embodiment, a player's ability to project and receive an object (e.g., baseball, football, hockey puck, lacrosse ball, or the like) may be analyzed. Exercise system 100 may be able to quantify, analyze, or help analyze a user's ability to use various muscle groups. In some embodiments, sport specific movements may be analyzed. In one embodiment, a hockey player's ability to give and receive passes of a hockey puck can be analyzed, as giving and receiving passes involve different muscle groups. Using exercise system 100, a coach, the user, a parent, or other interested third party may be able to tailor sport-specific activities or practices for the user to improve desired areas. For example, if the exercise system 100 determines that the player has muscle groups or skill developed for strong passing, but lacks muscle groups or skill necessary for strong receiving, a training program can be accordingly tailored. Sport specific analysis should not be limited to any particular sport. In one embodiment, exercise system 100 may be configured to tailor specific training analysis for CrossFit athletes.

In some embodiments, sport specific analysis may recognize characteristics associated with specific positions. For example, a user scoring low on throwing metrics but high on receiving metrics may be directed away from a position emphasizing throwing (e.g., a football quarterback or a baseball pitcher) toward a position emphasizing receiving (e.g., a football wide receiver (or tight end) or a baseball first baseman, or catcher). Thus, exercise system 100 may be used to younger, juvenile, or amateur athletes to encourage younger athletes to pursue more compatible positions. However, exercise system may be used with older, veteran, or more experienced athletes as well. In some embodiments, exercise system 100 may recommend that a user pursue a particular sport (e.g., soccer instead of basketball) based on an analysis of metrics.

In some embodiments, CrossFit or other suitable exercises may be analyzed, such as, e.g., wall ball exercise, a front squat, an overhead squat, a shoulder press, a push press, a push jerk, a deadlift, a sumo deadlift high pull, a clean, or a throw. These exercises may include dynamic movements involving numerous muscle groups. Characterizing, e.g., the power profiles of the dynamic exercises may allow athletes to focus on specific portions of each exercise when training to improve strength, form, and other quality aspects.

In some embodiments, exercise system 100 may be configured to determine specific future workouts or exercise plans for a user. In one embodiment, exercise system 100 may help determine parameters for future training. For example, exercise system 100 may be configured to determine which weight, duration, type, or other parameter of a given exercise is optimal for a given user at a given time and based on the user's goals and history. Exercise system 100, for example, may determine that a user has a better performance profile using a ball 900 having a first weight as opposed to using a ball 900 having a second weight. Thus, exercise 100 may determine which ball 900 a user should continue to train with based on receiving first performance data relating to an exercise (e.g., a wall ball exercise) performed by a user with a first ball 900 having a first weight (e.g., 10 pounds). Exercise system 100 may generate a first performance profile based on the first performance data. The first performance profile may be based on any of the measurements or parameters described herein, including, but not limited to a form of the exercise, an actual alignment of the user and/or ball, an ideal alignment of the user and/or ball, the user's goals or expectations, among others. Exercise system 100 also may receive second performance data relating to the exercise performed with a second ball 900 having a second weight (e.g., 15 pounds). Exercise system 100 may generate a second performance profile based on the second performance data, and compare the first performance profile with the second performance profile. Exercise system 100 may be configured to generate feedback based on the comparison by making a recommendation to the user to perform the exercise with the first ball 900 or the second ball 900 based on the comparison.

Exercise system 100 also may be configured to report a user's work and duration of workout, along with volume, technique, and time and date of workout, among other suitable workout parameters. Exercise system 100 may be configured to evaluate work capacity, fatigue limits, and endurance by objective measures, evaluate an accuracy of performed motions (e.g., as compared to an ideal trajectory), maintenance of proper tempo during movements, and the smoothness or linearity of motion, among other criteria.

Exercise system 100 may allow for the testing of physical fitness, including, but not limited to strength, range of motion, force/power/work output, rate of force development, and endurance using, e.g., standard exercise and sports equipment while performing exercises or prescribed test routines in traditional environments such as, e.g., a local gym. Previously, such testing required the use of expensive, specialized equipment, often unfamiliar to the test subject. Using standard equipment in a non-clinical environment that is familiar to the user may allow for more valid testing.

Furthermore, monitoring and measurement of characteristics of interest can be done in the middle of a regular exercise routine rather than as a special event. The use of a standard consumer interface (e.g. interface device 105) may permit consumers to monitor themselves when their coach or personal trainer is not available. Files and data recorded on interface device 105 can be forwarded to the appropriate parties for storage or later analysis. In some embodiments, exercise system 100 may monitor competitive athletes (e.g., professionals, collegiate athletes, amateurs who compete regularly) during their competitive season to identify any losses of endurance and/or increasing levels of fatigue. In some embodiments, the athletes may be assessed in the field or playing surface (e.g., using periodically repeated routines during warm-up and cool-down after competitions, for instance) with minimal disruption to their routines while adding very little stress or increasing exertion. For example, baseball players may perform a prescribed routine before and after each competition or game (e.g., exhibition, regular season, and/or playoff games) to assess fatigue and/or endurance over the course of a season. In some embodiments, athletes may deteriorate over the course of a season at different rates, and tracking player fatigue and/or endurance may facilitate the determination of customized rest schedules to help each athlete maintain endurance and reduce fatigue throughout the season.

In some embodiments, exercise system 100 may include direct force measurement which allows for the calculation of work where the force is not generated by accelerating a mass. Embodiments that measure force may do so in multiple axes and allow for the determination of vectors of force in addition to scalar quantities. In some embodiments, exercises utilizing traditionally non-quantifiable force, such as, e.g., elastic bands used for physiotherapy and general conditioning, can be quantified by force or resistance similar to the comparison of weights for, e.g., dumbbells.

Historically, a user could not easily determine how much force was being exerted against a band, and therefore prescribing exercises for people using bands was necessarily guesswork. Exercise system 100 may have capabilities not commonly seen in numerous existing devices. For example, force plates currently used to determine jump height do not calculate or present graphically rate of force development which is a key metric in some sports and disciplines. Such force plates also may be more expensive and less portable than exercise system 100.

Angles of motion can be determined accurately with the exercise system while it is being used, potentially eliminating or reducing the need for post-training video analyses and eliminating the error inherent in such post-training video systems caused by parallax. Thus, expensive and/or inconvenient video equipment may be eliminated.

However, in some embodiments, video and/or image analysis may be implemented in combination with exercise system 100. For example, remote motion tracking by video analysis and/or ultrasonic motion tracking may be utilized.

Movements of the user can be tracked using gesture and motion recognition devices, and the resulting exercise can be calculated from those motions being associated with the relevant mass. For instance, a video tracking device might distinguish the mass of the exercise ball being used from its color and pattern so that the system could do the related calculations with no input from the user. In some embodiments, video capture may occur through mobile video equipment, such as, e.g., digital cameras, or equipment associated with video game equipment such as, e.g., an XBOX Kinect, Nintendo Wii, or Playstation, among others.

Figure 29:
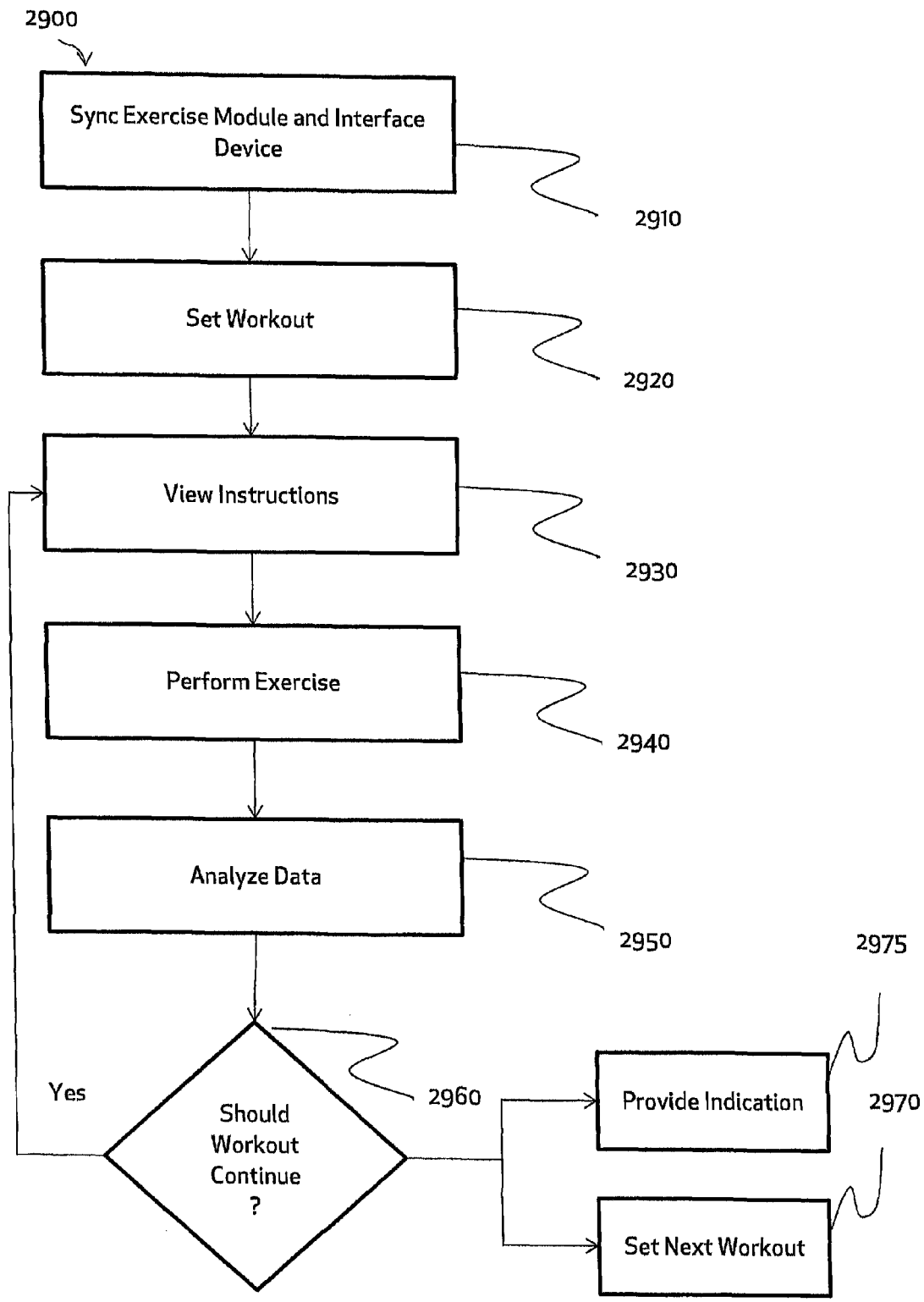

Exercise system 100 may be configured to accurately and objectively track exercise volume and technique. Traditionally, volume has been implemented as a workout benchmark by users that work to a perceived effort, by indirectly calculated volume, or by counting repetitions and sets. Exercise system 100 may allow for the tracking of these measures, and also enable the use of additional and alternative mechanisms of prescribing exercise volume, such as, e.g., measured effort or measured work and exercise until form (technique) starts to suffer due to the onset of fatigue, or fatigue itself, among others. A method 2900 for assessing exercise is shown in FIG. 29.

Method 2900 may begin at step 2910 where exercise module 101 is synced to interface device 105 in a substantially similar manner as described in step 2810 of FIG. 28. Method 2900 may proceed to step 2920, where the user may input, e.g., via interface device 105, a workout plan, workout goals, workout benchmarks, or other parameters into application program 112. In some embodiments, parameters may be adjusted or inputted based upon a most recent workout or workout history profile described later with reference to step 2970. In some embodiments, the workout plan and other parameters may be received by exercise module 101.

A user may then view instructions (step 2930) and perform a given exercise (step 2940). Steps 2930 and 2940 may correspond to steps 2820 and 2830 described with reference to FIG. 28. Data may be analyzed at step 2950 and a determination may be made at step 2960 if the workout should continue.

Exercise system 100 may allow prescription of workouts by specifying total work, minimum work per repetition to be maintained (thus ensuring a desired level of muscle fatigue), minimum technique parameters to be maintained (e.g., smoothness of motion, straightness of movement, and desired levels of acceleration), time and force curve for each repetition, or other desired motions as will be apparent to one familiar with the arts of training. That is, exercise system 100 may be configured to make real-time adjustments to workout plans based on the aforementioned parameters and analysis (step 2960).

In one embodiment, exercise system 100 may give outputs including, but not limited to, acceleration, angles of rotation, force, power, work, and motion smoothness, among others. Some or all of these outputs may be used to set goals for exercise or workouts. A workout may be prescribed by total work performed. A workout (or a segment of a given workout) may be prescribed complete when the user can no longer attain a certain level of force, which may be interpreted as the point of muscle exhaustion. An exercise may be interpreted to be finished when the motion can no longer be performed smoothly (e.g., an indicator of fatigue). Thus, each workout may be automatically optimized without close observation by the user, coach, trainer, or physical therapist. Thus, exercise system 100 may be configured to determine at step 2960. If the user's form on a given exercise is within an acceptable range, exercise system 100 may provide an indication to the user of a successful exercise, and method 2900 may return to step 2930, where interface device 105 may display a next exercise to be performed by the user. In such a manner, method 2900 may be prescribed as a training regimen.

Exercise system 100 may allow a user (or, e.g., the user's coach, personal trainer, or physical therapist) to prescribe exercise by non-traditional quantities, such as, e.g., by an effort value. As a workout routine is entered, application program 112, may display an effort value that must be achieved by the user to complete a routine. The achieved effort value may be calculated by one or more of the user's current workout, using historical data for that user, and by any other suitable factor. Application program 112 may display the effort value required for a single type of exercise user's focusing on a specific exercise (e.g., pushups, pull-ups, squats, throwing a baseball, or the like). The specific effort values may be displayed as subtotals of a broader effort value determination. An auto-balance function can adjust one or more of the entered exercises in a currently entered routine or a previously stored routine to a new effort value.

When exercise system 100 determines that a workout should not continue at step 2960, the method may proceed to step 2970, where exercise system 100 may set a subsequent workout for the user (e.g., to be performed at a later date).

Virtual Spotting

In some embodiments, the exercise system 100 also may, at step 2975 provide a real-time indication of poor technique to the user. That is, use of exercise system 100 also may allow for continuous real-time (or near-real-time, e.g., 1 second latency or less) monitoring of movements to help prevent injury by warning the user that they are straying from the prescribed or optimal technique or volume of exercise. Exercise system 100 may be configured to warn a user and/or third party that the user is fatigued or utilizing poor technique. Such determinations may utilize observations and measurements indicative of slow movements, incorrect angles, dwell at end of a movement, or unsteady, jerky motions, among others. In some embodiments, an actual alignment of a user may be compared to an ideal alignment of a user over one or more time periods of a performed exercise. Further, an actual alignment of a ball, e.g., ball 900, may be compared to an ideal position of the ball over one or more periods of a performed exercise.

In some embodiments, multiple screens may be used for near real-time display of technique, simultaneous display of parameters, and the display of outputs of several users simultaneously in one (possibly remote) location which will facilitate coaching and competitions among other uses. For instance, while using suspension training equipment, a module or combination of modules may report that spinal alignment is poor because the user is letting his or her back sag. A screen may be positioned in front of the user to illustrate the user's form visually using a model or avatar so that the user can see easily what he or she is doing incorrectly. Thus, a user may carry a mobile device (e.g., mobile phone or tablet) to the gym to record his or her workout. The completed workout may be downloaded for more specific analysis at a later time, while allowing the user to benefit from the feedback or automated spotting of technique on a larger, borrowed screen at the gym (e.g., on a screen belonging to the gym or other entity). In one embodiment, interface device 105 may be configured to assist a user by monitoring technique (e.g., virtual spotting or virtual coaching). That is, exercise system 100 may be configured to provide an indication (e.g., audio tones, blinking lights, vibrations) to warn of various failures in technique depending upon the desired outcome of the particular exercise. In one embodiment, exercise module 101 may additionally provide the indication or warning (e.g., by an audio tone, blinking light, vibration, or the like). For example, to build muscle mass, while performing extension exercises, it may be desirable to perform such extension exercises slowly (e.g., fixed, low tempo) and continuously (e.g., no dwell at the reversals). In another example, soft tissue work may have different requirements, while power training also may have its own technique and performance criteria. No matter the desired technique, exercise system 100 may be configured to alert a user while mistakes are occurring to help the user avoid injury and prevent the formation of bad habits. In cases where forces can be varied (e.g., exercise bands) by adjustment of the equipment, interface device 105 may display forces exerted in real time.

Exercise system 100 may monitor body alignment and limb positions during exercises to assist with injury avoidance (virtual spotting) and to ensure correct form and technique are used. The breakdown of technique can be used as a flag for prescribing exercises as mentioned above. Additionally, exercise system 100 may provide a real-time indication to the user, via, e.g., exercise module 101 or interface device 105 that the user's form is improper and that the exercise should be stopped and/or modified. In some embodiments, exercise system may signal a third party, e.g., a managed care provider, coach, commercial gym staff, or other interested party that the user is improperly performing an exercise. Such indications may help ensure user safety and prompt remedial action by other parties, if necessary. For example, a user may be prompted to view a demonstration of the exercise in interface device 105 before being allowed to resume the exercise.

Exercise system 100 may facilitate research by academics by allowing close, objective monitoring of test subject performance (rather than perceived effort scales, for instance) with typical exercise equipment.

In some embodiments, exercise system 100 may track workouts, send workout schedule reminders, and may create adaptive suggestions for rest between workouts. For example, based upon performance from a recent workout or series of workouts, difficulty of future workouts, amount of rest between recent workouts, amount of rest between a current workout and future workout, workout goals of the user, health of the user, the user's historical response to a particular exercise, and the user's age, among other factors, exercise system 100 may be configured to make recommendations to the user for adjusting a future workout schedule.

Exercise system 100 may allow for other adaptive prescriptions for exercise. In some embodiments, an exercise system may be configured to make real-time adjustments for a user's daily physical condition, temperament, motivation, etc. That is, the exercise system may account for, e.g., "good days" and "bad days," when muscle fatigue and exhaustion might come earlier or later in a given workout. Even professionals cannot determine when exhaustion or fatigue are occurring as accurately as direct measurement of movement. In some embodiments, the exercise system may make a determination as to the condition of the user, or, the user may select or otherwise inform the exercise system of the user's physical condition, temperament, motivation, or other state including, but not limited to, an objective state.

In some embodiments, interface device 105 and/or exercise module 101 may display alerts on a regular schedule. In some embodiments, interface device 105 may display automatic or selected reminders to a user for initiating or completing workouts, for example.

Exercise system 100 may provide motivation to users by giving real-time (or near-real-time) feedback of efforts and results, such as, e.g., improvements in strength, power and rate-of-force development.

Managed Care/Physical Therapy

Figure 30:
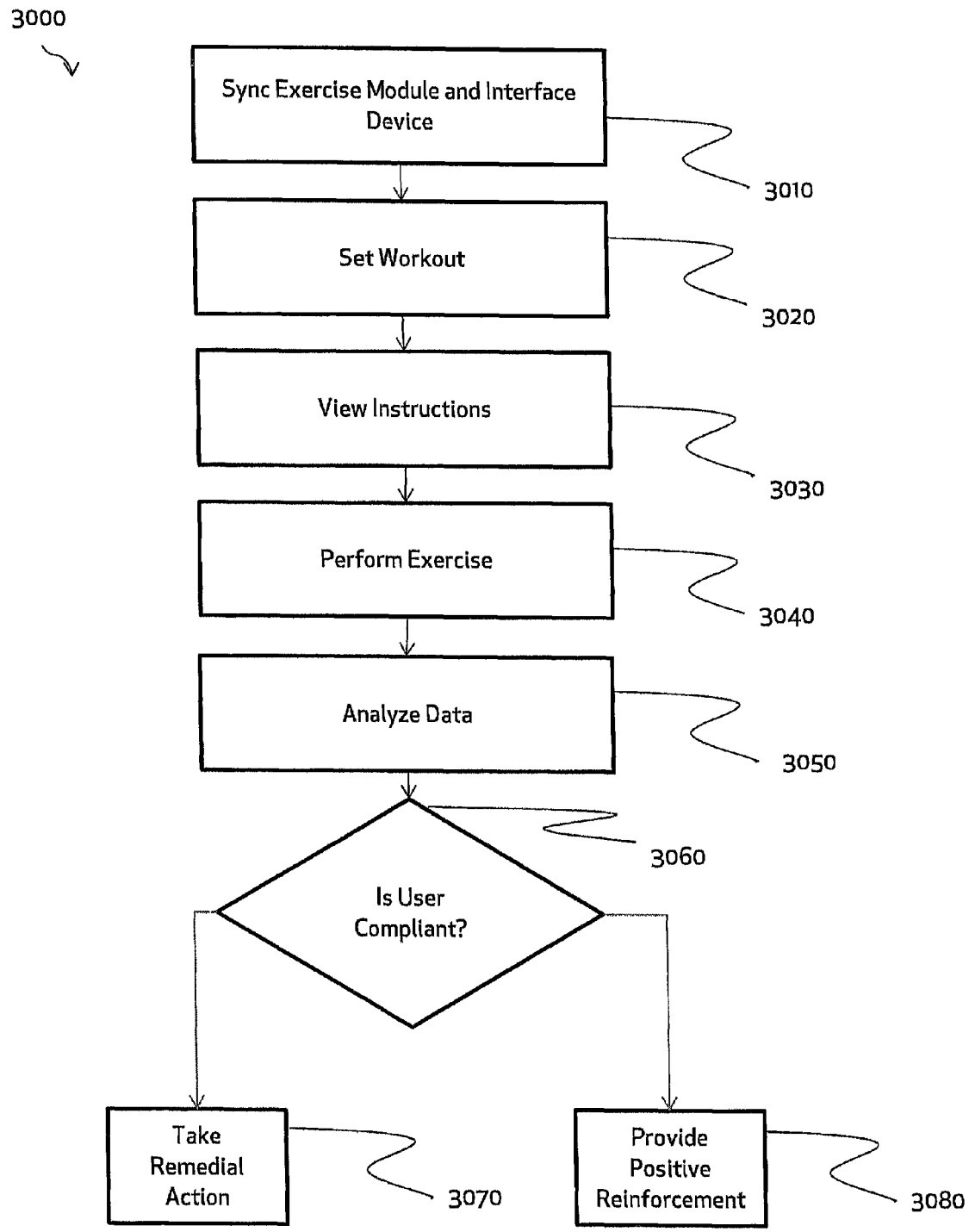

Exercise system 100 may be utilized to help users recover or otherwise rehabilitate from injuries. In some embodiments, exercise system 100 can assist with recovery from soft tissue injuries, or other types of injuries. FIG. 30 shows an exemplary method 3000 for assisting rehabilitation of injured persons.

Patient compliance may be a problem for physical therapists charged with helping patients regain strength and mobility lost due to injury, aging, neglect (e.g., a prolonged sedentary lifestyle), among other factors. Various embodiments of the present disclosure may enable remote monitoring of patient compliance with respect to volume and quality of exercise, and also may enable remote evaluations of progress and exercise program efficacy with respect to range of motion, strength, rate of force development, endurance, and cardiovascular response, among other parameters.

Increased patient compliance may reduce expenses by reducing recovery time, reducing the likelihood of re-injury, and reducing the amount of face-to-face time spent with healthcare professionals. The remote monitoring facilitated by the embodiments of the present disclosure may be less expensive than traditional mechanisms, may be omnipotent, and may be more effective than traditional mechanisms. For example, outcomes may be better for patient and provider while simultaneously reducing expenses, e.g., unnecessary appointments can be eliminated, patients can be called in at first sign of improper exercise technique or undesired physiological response to the prescribed program to forestall repeat or secondary injury. The remote monitoring of compliance and physiological response may allow the professional to send an updated or modified program to the patient/client remotely as desired.

Method 3000 may begin at step 3010 where exercise module 101 may be synced to interface device 105 in a substantially similar manner as described in step 2810 of FIG. 28. Method 3000 may proceed to step 3020, where the user may input, e.g., via interface device 105, a workout plan, workout goals, workout benchmarks, or other parameters into application program 112. As explained above, such parameters may be pre-programmed into interface device 105 or otherwise received via, e.g., electronic network 103. The parameters set at step 3020 may be set based upon the recommendation of a managed care provider or other rehabilitation specialist. Exercise system 100 can suggest a regimen of exercises to follow, given the age, gender, type of injury, and experience level of the user, to enable the injured user to establish sufficient soft tissue health before engaging in higher stress exercise for muscle building, speed, and power training. In some embodiments, exercise system 100 can ensure that rehabilitating athletes meet a baseline of health before reinitiating normal sports training. Formal routines for rehabilitation can be programmed into software applications that a managed care provider, or other suitable party, can customize to an individual user and/or injury.

Prescriptions for exercises can include any suitable parameter, such as, e.g., intensity (of force or rate of force development), total effort (work performed and the rate at which it is performed, power), and speed of movement, among others. A professional may be able to determine that a client or patient is not performing the exercises according to the prescribed schedule, and may subsequently contact the client through a provided smartphone or other application to inquire about the reason for non-compliance. In some embodiments, the professional may warn the client or patient of the dangers of sedentary behavior or non-compliance. In some embodiments of non-compliance, the client or patient may be overly enthusiastic or energetic, may perform too much exercise, or may be performing exercises too frequently (which may be common with serious or competitive athletes). In these embodiments, prescribed therapy routines may be ineffective due to insufficient rest and recovery time, which may be identified by the professional and communicated to the client or patient.

A user may then view instructions (step 3030) and perform a given exercise (step 3040). Steps 3030 and 3040 may correspond to steps 2820 and 2830 described with reference to FIG. 28. Data may be analyzed at step 3050 and a determination may be made at step 3060 if the user is complying with the workout plan set in step 3020.

For example, after a workout prescribed by a managed care provider, exercise system 100 can analyze a user's workout for compliance at step 3060 (e.g., completion, adherence to prescribed volume, efforts, or technique) so the managed care provider can track the progress of the user. That is, upon completion of a routine or prescribed set of exercises, the user may move details of the session to a database or third party device through the network 103 connected to the interface device 105. For example, a person doing exercises for rehabilitation of a work related injury might pass session data to a managed care provider. Such transmission of data may allow managed care providers to ensure user compliance and spot trends in the users behavior (such as, e.g., poor technique that might lead to a recurrence of the injury or progress that will allow for cost and time savings for both parties by increasing the interval between follow-on visits).

Various factors can be used to grade the performance of prescribed exercises so that the managed care provider can give feedback to the user. For example, the managed care provider may suggest to the user to reduce the forces by standing closer to the anchor points of elastic bands. Users can be encouraged to monitor force readouts on, e.g., interface devices 105 in real-time.

For example, as the user performs a prescribed physical therapy routine, the application software on interface device 105 can inform the user of correct compliance with the prescribed routine and proceed to step 3080, or of improper execution with respect to measured force, range of motion, speed of motion, volume (e.g., total work or effort expended, repetitions and or sets performed), or quality of movement (e.g., shaking due to muscle fatigue or lack of linearity of motion). If the user is at risk of exacerbating the injury being treated, or of suffering a new injury, interface device 105 may, via the managed care provider or through an automated algorithm, advise the user to stop immediately (step 3070). In embodiments where interface device 105 issues warnings to the user based on an automated algorithm, exercise system 100 also may notify the managed care provider (or other interested, authorized party) of the user's non-compliance. This may enable the managed care provider to become aware of problems as they occur, so that such problems can be addressed quickly before worsening the user's condition or injury. The user can thus be prevented from exacerbating the injury by warnings from interface device 105. After some number of warnings, exercise system 100 can notify the managed care provider that the user needs to return for a follow-up appointment before continuing with the program. In cases of re-injury risk, the managed care provider can send a text message, email, initiate a phone call, or otherwise contact the user advising the user to schedule an appointment to review the prescribed routine with, e.g., a managed care provider. In cases where the user is non-compliant, interface device 105 can remind the user when a scheduled workout time has arrived, has been missed, and/or that workout data have not been uploaded to, e.g., a central server. These reminders may initiate action by the user. It should be noted that user non-compliance is a leading cause of physical therapy failure.

Monitoring of efficacy and patient progress can be performed before and after workouts, treatment sessions, physical therapy sessions, or the like, to observe and quantify the results of the prescribed exercise. For example, an exercise routine performed with, e.g., therapy bands, may result in an increased pain-free range of motion. Further, the comparison of the range of motion prior to this workout with the range of motion after the prior workout may allow the professional to ascertain how much the patient regresses or backslides between workouts. Such regression or deterioration might suggest that the frequency of workouts needs to be adjusted.

Assessments of performance between workouts can let the professional determine the response of muscles after a period of rest. If insufficient rest has occurred and the muscle has not responded with an increase of strength, then the next workout can be rescheduled or the workouts can be restructured (e.g., to reduce the intensity of a subsequent workout).

Assessments may include using various embodiments of the present disclosure to determine neuromuscular response time, which may recover quickly between workouts and should increase over time, particularly after a period of the muscle being lightly used after an injury.

In some embodiments, exercise system 100 may utilize a heart rate monitor to measure cardiovascular response to quantified amounts of exertion, exercise, or other physical activity. Thus, over-training may be observed easily (a prescribed volume of exercise quickly may lead to a climb in heart rate above the subject's historical norms), and more rest can be prescribed or the order of workouts can be altered. A workout based on hypertrophy and time in tension may be substituted for a cardiovascular-focused workout, for example. Exercise routines can also be prescribed by heart rate by having e.g., interface device 105 display heart rate and modify the exercise during the cardiovascular workout. For instance, a set of exercises using, e.g., a ball 900 or the like, may be reduced in tempo or a lighter ball 900 may be substituted. Cardiac monitors that report the onset of arrhythmia can be supported in a mobile application or the like to warn the patient to stop immediately and contact their health provider. A failure to acknowledge the alarm may trigger an automated response. In some embodiments, failure to acknowledge the alarm may initiate a call to a physical therapist, health care professional, family member, emergency contact, or an emergency response provider (e.g., an automated 911 call from a smartphone), if desired.

Various embodiments of the present disclosure can be used to determine the client or patient's maximum strength (e.g., a one rep maximum) for various muscles. A properly prescribed program can increase this measurement. In some embodiments, exercise system 100 can track the volume (total effort), intensity (power), and speed of movement during workouts to determine if maximum strength is responding as expected. Failure of the program may indicate metabolic disorders. The longitudinal data provided by the described system may thus be a valuable diagnostic tool which is not prone to errors caused by poor performance during a single appointment (perhaps due to an effect similar to the "white coat effect" that causes clinically obtained blood pressure readings to often be higher than blood pressure readings obtained in other, less stressful environments).

Enhanced monitoring of patients on restricted activity can be supported with this system. For instance, a module can be attached to a cast, built in to a cast, wrapped in an Ace bandage or tucked inside a sock to monitor a lower limb. Thus, a mobile device application can remind the user to elevate the limb on schedule and even apply ice or heat (a module may have built-in temperature measurement capability). Failure to comply with this prescribed regimen can be reported remotely to a physical therapist, health care provider, or other suitable entity. Long periods of inactivity in poor or suboptimal positions (e.g., sitting with a leg pointed down at the floor, which can lead to swelling for example) can be detected and the patient notified via smartphone alarm. A module placed on a lower limb can also detect the improper use of crutches which can exacerbate an injury and prolong recovery. In such embodiments, the module may include suitable sensors, such as, e.g., a gyroscope and/or an accelerometer to assist in identifying an orientation of a subject's limb.

A module worn on a belt also may detect stride length and/or tempo to remind those who are normally very active that they are over-exerting an injured muscle, e.g., injured Achilles tendon, among other applications which professionals may want to monitor.

In some embodiments, users, clients, or patients, utilizing a patient compliance program or module may receive discounts on premiums (e.g., health insurance premiums) by self-identifying as being conscientious of their health and by building a base-line to work towards when recovering from an injury. In particular, companies may screen employees for baseline physical capabilities periodically to aid in recovery in the event of a workers' compensation claim. Employees found weak during an initial screening can be encouraged to exercise to build strength to avoid injury. Rotator cuff injuries among key-boarding office workers are an example of proactively avoidable conditions which may be difficult to treat and cause marked reductions in quality of life.

Thus, exercise system 100 may reduce the risk of injury for users on rehabilitation programs resulting from the improper performance or execution of prescribed exercises. Exercise system 100 may be a portable system that allows monitoring of technique for physical therapy applications that can notify a managed care provider or therapist in real-time (or near-real-time) that the user is not performing as prescribed. The managed care provider may then deduce that the user can benefit another lesson/further instruction before proceeding with the prescribed program.

Additionally, exercise system 100 may permit a managed care provider to cancel future appointments should the user be compliant, exhibit progress, and/or show proper form with prescribed procedures, potentially saving time and money for the user, and saving the provider money and resources. That is, the user can be rewarded with a text, email or call that suggesting delay or cancellation of a next appointment, thus saving the provider and client time, resources and money. In some embodiments, a future appointment may be cancelled and the user may be prescribed at-home or self-monitored exercises to continue rehabilitation while reducing costs and increasing convenience.

Coaching/Recruiting

Various embodiments of the present disclosure may be used in performance evaluations for team sports or by team staff such as coaches and scouts. It is also contemplated that exercise system 100 can be used to evaluate individual sports players. For example, exercise system 100 may enable the monitoring exercise or training volume and intensity by coaches, athletes, physiotherapists, or wellness providers.

In some embodiments, users may be able to compete with other users in real-time, in person, or over the internet. In some embodiments, individual users may compete against themselves or others through time by archiving the information transmitted or recorded by the exercise system 100.

Exercise system 100 may be configured to predict and/or measure muscle performance that is difficult to view with the human eye or even measurable data. For example, two baseball players may both be capable of throwing a baseball at a speed of 95 mph. However, one player may have experienced full muscle development, while another player may still have an undeveloped musculature. This analysis may be used as a recruiting consideration, particularly when analyzing younger players that may not have reached physical maturity.

In some embodiments, exercise system 100 may be used to grade athletes according to a specific position within a given sport. For example, a baseball pitcher may be graded on a different scale than an outfielder. Thus, exercise system 100 may differentiate the muscles, skills, and development specific to pitchers, catchers, infielders, and outfielders when analyzing baseball players. Similarly, soccer players may be analyzed with a higher emphasis on kicking ability, leg muscles, and leg strength.

In some embodiments, exercise system 100 may be used for remote coaching, remote fitness evaluation and monitoring, to provide real-time displays of performance during broadcasts, and allow coaches to monitor evaluate performance during competition via a wall-mounted television, for example.

Embodiments of the present disclosure can use standard equipment, thereby potentially eliminating expensive and specialized equipment such as, e.g., force plates and radar guns used in some testing applications, and allowing measurements under real world conditions rather than only in the lab or gym.

Embodiments of the system may utilize network connections for moving data from the physical embodiments to remote storage or remote processing equipment. Remote storage will allow sports teams (professional and collegiate, for instance) to warehouse data for recruiting, tracking training progress, and for early identification of trends of interest, such as deteriorating performance on an individual athlete that might indicate over-training or latent injury. Remote processing of data from physical embodiments allows for reduced energy and processing requirements of exercise module 101 and/or interface device 105, among other benefits.

In a competitive environment, such as, e.g., team sports or a group workout in a CrossFit gym, the networking capability allows for near real-time display of players' performance.

Upon completion of a routine or prescribed set of exercises, the user may move details of the session to a database or third party through the network 103 connected to the interface device 105. For example, a collegiate athlete might transmit the data to her coach, a person doing exercises for rehabilitation of a work related injury might pass session data to a managed care provider or the similar entity. Such transmission of data may allow coaches to track progress remotely and automatically, and allow managed care providers to ensure user compliance and spot trends in the users behavior (such as, e.g., poor technique that might lead to a recurrence of the injury or progress that will allow for cost and time savings for both parties by increasing the interval between follow-on visits). Thus, exercise system 100 may reduce the risk of injury for users on rehabilitation programs resulting from the improper performance or execution of prescribed exercises.

Embodiments of the present disclosure also may be used for purposes that will be apparent to those familiar with sports training, physiotherapy, performance measurement, exercise planning, human biodynamics or kinesiology. In some embodiments, exercise system 100 may be used for self-testing to determine current fitness and flexibility level.

It should be noted that the various methods disclosed herein (e.g., methods 2800-3000 may omit certain disclosed steps, may include one or more other suitable steps, and may perform steps in any suitable or desired order.

It will be apparent to those skilled in the art that various modifications and variations can be made in the disclosed systems and processes without departing from the scope of the disclosure. Other embodiments of the disclosure will be apparent to those skilled in the art from consideration of the specification and practice of the embodiments disclosed herein. It is intended that the specification and examples be considered as exemplary only. The following disclosure identifies some other exemplary embodiments.

We claim:

1. A method for assessing physical performance of a user with a weighted exercise implement, the method comprising:
   wirelessly receiving, at a wireless electronic device, first performance data sensed by a sensor coupled to the weighted exercise implement when a user performs a movement with the weighted exercise implement, the sensor including one or more of an accelerometer, a magnetometer, and a gyroscope; the weighted exercise implement further including therein at least a wireless transmitter for sending the first performance data to the wireless electronic device, and a rechargeable power source, wherein the first performance data includes acceleration, rate of rotation, force, power, direction, and angle of motion, for both a concentric phase and an eccentric phase of the user's movement; wherein the weighted exercise implement is a weighted medicine ball;
   analyzing, at a first processor, the first performance data to determine one or more of an accuracy of the user's movement and a smoothness of the user's movement;
   wherein the accuracy of the user's movement is determined by comparing an actual path of the user's movement to an ideal path of the user's movement, and wherein the smoothness of the user's movement is determined by comparing an actual smoothness of the user's movement to an ideal smoothness of the user's movement;
   generating feedback based on the determined one or more of the accuracy of the user's movement and the smoothness of the user's movement by making a recommendation to the user regarding a subsequent movement; and
   displaying the generated feedback on a display of the wireless electronic device.

2. The method of claim 1, wherein the wireless electronic device is a touchscreen enabled device.

3. The method of claim 1, wherein the wireless electronic device syncs to the first sensor before receiving the first performance data.

4. The method of claim 1, further including displaying a plurality of exercises on a display prior to receiving the first performance data.

5. The method of claim 4, further including receiving a selection of one of the plurality of exercises displayed on the display prior to receiving the first performance data.

6. The method of claim 1, further including simultaneously displaying the peak watts, speed, and force of the movement on the wireless electronic device.

7. The method of claim 1, further including receiving a workout goal from the user.

8. The method of claim 7, wherein the method further includes generating feedback based on the workout goal received from the user.

9. A method for assessing physical performance of a user using a first medicine ball and a second medicine ball, the method comprising:
   displaying a plurality of exercises on a touchscreen display of an interface device;
   receiving, from the user, a selection of a throw from the plurality of exercises displayed on the touchscreen display;
   receiving, from the user, a workout goal of the user;
   after receiving from the user a selection of a throw, displaying a representation of an ideal path of a medicine ball during a throw on the display of the interface device;
   displaying a representation of a throw from multiple angles such that the user may ascertain the proper tempo of a throwing motion to be performed by the user;
   wirelessly syncing the interface device with the first medicine ball having a first sensor embedded within the first medicine ball, the first medicine ball having:
      a first weight;
      a wireless transmitter;
      a rechargeable power source;
      a covering that is laced shut to secure the first sensor to the first medicine ball;
      an accelerometer;
      a three axis gyroscope;
      a magnetometer; and
      two elastic handles that are mounted on opposite sides of the first medicine ball that are each configured to stretch away from the outer surface of the first medicine ball to allow a user to hold the first medicine ball at arms length without using muscles to squeeze the first medicine ball;
   after receiving the selection of a throw from the plurality of exercises and after syncing the interface device with the first ball, receiving first performance data sensed by the first sensor during performance of a first throw by the user with the first medicine ball, wherein the first performance data includes acceleration, rate of rotation, force, power, direction, and angle of motion, for both a concentric phase and an eccentric phase of the first throw;
   generating a first performance profile based on the first performance data for both the concentric phase and the eccentric phase of the first throw, the first performance profile including peak watts, speed, and force of the selected exercise performed by the user with the first medicine ball;
   analyzing, at a first processor, the first performance data to determine the accuracy of the first throw;
   wherein the accuracy of the first throw is determined by comparing an actual path of the first medicine ball during the first throw to an ideal path of the first medicine ball during the first throw;

determining a form of the first throw by analyzing the speed, angle, dwell, jerkiness, the accuracy of the first throw, a linearity of the first throw as compared to an ideal linearity, and a tempo of the first throw as compared to an ideal tempo;

providing a real-time indication to the user that the user's form during the first throw is incorrect and that the first throw should be stopped, wherein the real-time indication is an audio tone, blinking light, or vibration;

simultaneously displaying a representation of the actual path of the first medicine ball during the first throw with the representation of the ideal path of a medicine ball;

simultaneously displaying, on the interface device, the peak watts, speed, and force of the first throw performed by the user with the first medicine ball;

wirelessly syncing the interface device with the second medicine ball having a second sensor embedded into the second medicine ball, the second medicine ball having:
a second weight that is different than the first weight;
a wireless transmitter;
a rechargeable power source;
a covering that that is laced shut to secure the second sensor to the second medicine ball;
an accelerometer;
a three axis gyroscope;
a magnetometer; and
two elastic handles that are mounted on opposite sides of the second medicine ball that are each configured to stretch away from the outer surface of the second medicine ball to allow a user to hold the second medicine ball at arms length without using muscles to squeeze the second medicine ball;

after syncing the interface device with the second medicine ball, receiving second performance data sensed by the second sensor during performance of a second throw by the user with the second medicine ball, wherein the second performance data includes acceleration, rate of rotation, force, power, direction, and angle of motion, for both a concentric phase and an eccentric phase of the first throw;

generating a second performance profile for both the concentric phase and the eccentric phase of the second throw based on the second performance data, the second performance profile including peak watts, speed, and force of the second throw performed by the user with the second medicine ball;

analyzing, at the first processor, the second performance data to determine the accuracy of the second throw;

wherein the accuracy of the second throw is determined by comparing an actual path of the second medicine ball during the second throw to an ideal path of the second medicine ball during the second throw;

determining a form of the second throw by analyzing the speed, angle, dwell, jerkiness, the accuracy of the second throw, a linearity of the second throw as compared to an ideal linearity, and a tempo of the second throw as compared to an ideal tempo;

providing a real-time indication to the user that the user's form during the second throw is incorrect and that the second throw should be stopped, wherein the real-time indication is an audio tone, blinking light, or vibration;

simultaneously displaying a representation of the actual path of the second medicine ball during the second throw with the representation of the ideal path of the second medicine ball during the second throw;

simultaneously displaying, on the interface device, the peak watts, speed, and force of the second throw performed by the user with the second medicine ball;

comparing the first performance profile with the second performance profile based on the form of the user during the first throw with the first medicine ball or during the second throw with the second medicine ball; and generating feedback based on the comparison and the workout goal received from the user by making a recommendation to the user to subsequently perform a future throw with the first medicine ball or the second medicine ball based on the comparison, and adjusting a future workout recommendation based on the comparison, and displaying a form correction recommendation for a future throw to the user.

10. The method of claim 9, further including charging the rechargeable power source of the first medicine ball via a USB connection.

11. The method of claim 9, wherein the first and second throws are each rotational throws.

* * * * *

UNITED STATES PATENT AND TRADEMARK OFFICE
CERTIFICATE OF CORRECTION

| | | |
|---|---|---|
| PATENT NO. | : 9,135,347 B2 | Page 1 of 1 |
| APPLICATION NO. | : 14/261848 | |
| DATED | : September 15, 2015 | |
| INVENTOR(S) | : Scott Robert Damman et al. | |

It is certified that error appears in the above-identified patent and that said Letters Patent is hereby corrected as shown below:

In claim 3, column 29, line 66, "first sensor" should be replaced with -- sensor --.

Signed and Sealed this
Second Day of February, 2016

Michelle K. Lee
*Director of the United States Patent and Trademark Office*